US011037397B2

(12) United States Patent
Cage et al.

(10) Patent No.: US 11,037,397 B2
(45) Date of Patent: Jun. 15, 2021

(54) PROCESSING OF A USER DEVICE GAME-PLAYING TRANSACTION BASED ON LOCATION

(71) Applicant: e2interactive, Inc., Atlanta, GA (US)

(72) Inventors: Daniel Cage, Atlanta, GA (US); Roy Leach, Elizabeth, CO (US); David Tashjian, Fort Lauderdale, FL (US)

(73) Assignee: E2INTERACTIVE, INC., Atlanta, GA (US)

(*) Notice: Subject to any disclaimer, the term of this patent is extended or adjusted under 35 U.S.C. 154(b) by 94 days.

(21) Appl. No.: 16/189,227

(22) Filed: Nov. 13, 2018

(65) Prior Publication Data

US 2019/0080557 A1 Mar. 14, 2019

Related U.S. Application Data

(63) Continuation of application No. 15/818,041, filed on Nov. 20, 2017, now Pat. No. 10,127,764, which is a
(Continued)

(51) Int. Cl.
*G07F 17/32* (2006.01)
*G06Q 30/02* (2012.01)
*G06Q 30/06* (2012.01)

(52) U.S. Cl.
CPC ......... *G07F 17/3223* (2013.01); *G06Q 30/02* (2013.01); *G06Q 30/0609* (2013.01);
(Continued)

(58) Field of Classification Search
CPC combination set(s) only.
See application file for complete search history.

(56) References Cited

U.S. PATENT DOCUMENTS 4,669,730 A 6/1987 Small
4,815,741 A 3/1989 Small
(Continued)

FOREIGN PATENT DOCUMENTS

CA 2548533 6/2005
CN 102054185 5/2011
(Continued)

OTHER PUBLICATIONS

International Search Report and the Written Opinion dated Feb. 11, 2014 of International Patent Application No. PCT/US2013/058078.
(Continued)

*Primary Examiner* — Pierre E Elisca
(74) *Attorney, Agent, or Firm* — Landmark Intellectual Property Law, PLLC; Gregory Murphy

(57) ABSTRACT

An exemplary method comprises receiving information associated with a game-playing transaction conducted between a user device and a game-playing terminal, wherein the game-playing transaction is associated with a request for playing a game; determining a location of the user device associated with the game; determining the user device is located in an approved location associated with the game; and processing the game-playing transaction based on determining the user device is located in the approved location associated with the game. The game-playing transaction is conducted on a first communication interface, and the information associated with the game-playing transaction is received on a first or second communication interface.

20 Claims, 12 Drawing Sheets

Related U.S. Application Data continuation of application No. 15/614,486, filed on Jun. 5, 2017, now Pat. No. 9,824,530, which is a continuation of application No. 14/958,715, filed on Dec. 3, 2015, now Pat. No. 9,672,687, which is a continuation of application No. 14/018,276, filed on Sep. 4, 2013, now Pat. No. 9,227,136.

(60) Provisional application No. 61/696,533, filed on Sep. 4, 2012.

(52) U.S. Cl.
CPC ...... *G07F 17/3218* (2013.01); *G07F 17/3225* (2013.01); *G07F 17/3237* (2013.01); *G07F 17/3255* (2013.01); *G07F 17/329* (2013.01)

(56) References Cited

U.S. PATENT DOCUMENTS

| | | | |
|---|---|---|---|
| 4,833,307 A | 5/1989 | Gonzalez-Justiz | |
| 5,083,272 A | 1/1992 | Walker et al. | |
| 5,216,595 A | 6/1993 | Protheroe | |
| 5,239,165 A | 8/1993 | Novak | |
| 5,330,185 A | 7/1994 | Wells | |
| 5,383,113 A | 1/1995 | Kight et al. | |
| 5,417,424 A | 5/1995 | Snowden et al. | |
| 5,590,038 A | 12/1996 | Pitroda | |
| 5,699,528 A | 12/1997 | Hogan | |
| 5,708,780 A | 1/1998 | Levergood et al. | |
| 5,873,072 A | 2/1999 | Kight et al. | |
| 5,884,271 A | 3/1999 | Pitroda | |
| 5,890,718 A | 4/1999 | Byon | |
| 5,897,625 A | 4/1999 | Gustin et al. | |
| 5,919,091 A | 7/1999 | Bell et al. | |
| 5,935,000 A | 8/1999 | Sanchez, III | |
| 5,991,413 A | 11/1999 | Arditti et al. | |
| 5,991,749 A | 11/1999 | Morrill, Jr. | |
| 6,000,608 A | 12/1999 | Dorf | |
| 6,021,397 A | 2/2000 | Jones et al. | |
| 6,029,151 A | 2/2000 | Nikander | |
| 6,055,567 A | 4/2000 | Ganesan et al. | |
| 6,062,472 A | 5/2000 | Cheung | |
| 6,070,150 A | 5/2000 | Remington et al. | |
| 6,085,242 A | 7/2000 | Chandra | |
| 6,142,369 A | 11/2000 | Jonstromer | |
| 6,169,890 B1 | 1/2001 | Vatanen | |
| 6,175,823 B1 | 1/2001 | Dusen | |
| 6,185,545 B1 | 2/2001 | Resnick et al. | |
| 6,240,397 B1 | 5/2001 | Sachs | |
| 6,267,670 B1 | 7/2001 | Walker et al. | |
| 6,277,026 B1 | 8/2001 | Archer | |
| 6,289,322 B1 | 9/2001 | Kitchen et al. | |
| 6,304,860 B1 | 10/2001 | Martin et al. | |
| 6,322,446 B1 | 11/2001 | Yacenda | |
| 6,324,525 B1 | 11/2001 | Kramer et al. | |
| 6,327,577 B1 | 12/2001 | Garrison et al. | |
| 6,334,116 B1 | 12/2001 | Ganesan et al. | |
| 6,360,254 B1 | 3/2002 | Linden et al. | |
| 6,363,362 B1 | 3/2002 | Burfield et al. | |
| 6,363,364 B1 | 3/2002 | Nel | |
| 6,364,206 B1 | 4/2002 | Keohane | |
| 6,366,893 B2 | 4/2002 | Hannula et al. | |
| 6,442,532 B1 | 8/2002 | Kawan | |
| 6,507,823 B1 | 1/2003 | Nel | |
| 6,508,710 B1 | 1/2003 | Paravia et al. | |
| 6,529,956 B1 | 3/2003 | Smith et al. | |
| 6,547,131 B1 | 4/2003 | Foodman et al. | |
| 6,585,589 B2 | 7/2003 | Okuniewicz | |
| 6,594,644 B1 | 7/2003 | Dusen | |
| 6,607,439 B2 | 8/2003 | Schneier et al. | |
| 6,609,113 B1 | 8/2003 | O'Leary et al. | |
| 6,616,531 B1 | 9/2003 | Mullins et al. | |
| 6,622,015 B1 | 9/2003 | Himmel et al. | |
| 6,678,664 B1 | 1/2004 | Ganesan | |
| 6,684,269 B2 | 1/2004 | Wagner | |
| 6,705,520 B1 | 3/2004 | Pitroda et al. | |
| 6,769,607 B1 | 8/2004 | Pitroda et al. | |
| 6,805,289 B2 | 10/2004 | Noriega et al. | |
| 6,807,410 B1 | 10/2004 | Pailles et al. | |
| 6,819,219 B1 | 11/2004 | Bolle et al. | |
| 6,824,464 B2 | 11/2004 | Weil et al. | |
| 6,836,765 B1 | 12/2004 | Sussman | |
| 6,839,692 B2 | 1/2005 | Carroll et al. | |
| 6,839,744 B1 | 1/2005 | Kloba et al. | |
| 6,848,613 B2 | 2/2005 | Nielsen et al. | |
| 6,856,974 B1 | 2/2005 | Ganesan et al. | |
| 6,868,391 B1 | 3/2005 | Hultgren | |
| 6,869,358 B2 | 3/2005 | Yacenda | |
| 6,899,621 B2 | 5/2005 | Behm et al. | |
| 6,918,537 B2 | 7/2005 | Graves et al. | |
| 6,925,439 B1 | 8/2005 | Pitroda | |
| 6,932,268 B1 | 8/2005 | McCoy et al. | |
| 6,934,529 B2 | 8/2005 | Bagoren et al. | |
| 6,934,689 B1 | 8/2005 | Ritter et al. | |
| 6,941,270 B1 | 9/2005 | Hannula | |
| 6,948,063 B1 | 9/2005 | Ganesan et al. | |
| 6,988,657 B1 | 1/2006 | Singer et al. | |
| 7,014,107 B2 | 3/2006 | Singer et al. | |
| 7,024,396 B2 | 4/2006 | Woodward | |
| 7,054,842 B2 | 5/2006 | James et al. | |
| 7,072,854 B2 | 7/2006 | Loeser | |
| 7,083,084 B2 | 8/2006 | Graves et al. | |
| 7,085,931 B1 | 8/2006 | Smith et al. | |
| 7,086,584 B2 | 8/2006 | Stoutenburg et al. | |
| 7,093,761 B2 | 8/2006 | Smith et al. | |
| 7,128,274 B2 | 10/2006 | Kelley et al. | |
| 7,130,817 B2 | 10/2006 | Karas et al. | |
| 7,165,052 B2 | 1/2007 | Diveley et al. | |
| 7,168,616 B2 | 1/2007 | Carnation | |
| 7,177,428 B2 | 2/2007 | Gordon et al. | |
| 7,182,252 B1 | 2/2007 | Cooper et al. | |
| 7,209,889 B1 | 4/2007 | Whitfield | |
| 7,216,092 B1 | 5/2007 | Weber et al. | |
| 7,222,101 B2 | 5/2007 | Bishop et al. | |
| 7,229,006 B2 | 6/2007 | Babbi et al. | |
| 7,229,014 B1 | 6/2007 | Snyder | |
| 7,249,097 B2 | 7/2007 | Hutchison et al. | |
| 7,316,350 B2 | 1/2008 | Algiene | |
| 7,328,190 B2 | 2/2008 | Smith et al. | |
| 7,356,327 B2 | 4/2008 | Cai et al. | |
| 7,383,226 B2 | 6/2008 | Kight et al. | |
| 7,494,417 B2 | 2/2009 | Walker et al. | |
| 7,547,251 B2 | 6/2009 | Walker et al. | |
| 7,621,810 B2 | 11/2009 | Gilmore et al. | |
| 7,690,580 B2 | 4/2010 | Shoemaker | |
| 7,702,542 B2 | 4/2010 | Aslanian, Jr. | |
| 7,774,209 B2 | 8/2010 | James et al. | |
| 7,899,706 B1 | 3/2011 | Stone et al. | |
| 7,905,399 B2 | 3/2011 | Barnes et al. | |
| 8,103,520 B2 | 1/2012 | Mueller et al. | |
| 8,219,497 B2 | 7/2012 | Crucs | |
| 8,396,758 B2 | 3/2013 | Paradise et al. | |
| 8,408,986 B2 | 4/2013 | Irwin et al. | |
| 8,509,814 B1 | 8/2013 | Parker | |
| 8,775,814 B2 | 7/2014 | Bidare et al. | |
| 8,784,180 B2 | 7/2014 | Stanek | |
| 9,098,190 B2 * | 8/2015 | Zhou | H04M 17/304 |
| 9,227,136 B2 | 1/2016 | Cage et al. | |
| 9,672,687 B2 | 6/2017 | Cage et al. | |
| 9,672,697 B2 | 6/2017 | Cage et al. | |
| 9,865,135 B2 | 1/2018 | Giunti | |
| 2001/0001856 A1 | 5/2001 | Gould et al. | |
| 2001/0005840 A1 | 6/2001 | Verkama | |
| 2001/0007983 A1 | 7/2001 | Lee | |
| 2001/0011248 A1 | 8/2001 | Himmel et al. | |
| 2001/0042785 A1 | 11/2001 | Walker et al. | |
| 2001/0044776 A1 | 11/2001 | Kight et al. | |
| 2001/0045456 A1 | 11/2001 | Smith | |
| 2002/0002535 A1 | 1/2002 | Kitchen et al. | |
| 2002/0010627 A1 | 1/2002 | Lerat | |
| 2002/0010677 A1 | 1/2002 | Kitchen et al. | |
| 2002/0013768 A1 | 1/2002 | Ganesan | |
| 2002/0019809 A1 | 2/2002 | Kitchen et al. | |

(56) References Cited

U.S. PATENT DOCUMENTS

| | | |
|---|---|---|
| 2002/0022472 A1 | 2/2002 | Watler et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062249 A1 | 5/2002 | Iannacci et al. |
| 2002/0062282 A1 | 5/2002 | Kight et al. |
| 2002/0065773 A1 | 5/2002 | Kight et al. |
| 2002/0065774 A1 | 5/2002 | Young et al. |
| 2002/0077993 A1 | 6/2002 | Immonen et al. |
| 2002/0094858 A1 | 7/2002 | Yacenda |
| 2002/0095387 A1 | 7/2002 | Sosa et al. |
| 2002/0111906 A1 | 8/2002 | Garrison et al. |
| 2002/0116329 A1 | 8/2002 | Serbetcioglu et al. |
| 2002/0116531 A1 | 8/2002 | Chu |
| 2002/0120571 A1 | 8/2002 | Maung et al. |
| 2002/0128968 A1 | 9/2002 | Kitchen et al. |
| 2002/0138450 A1 | 9/2002 | Kremer |
| 2002/0145039 A1 | 10/2002 | Carroll |
| 2002/0152123 A1 | 10/2002 | Giordano et al. |
| 2002/0152160 A1 | 10/2002 | Allen-Rouman et al. |
| 2002/0152179 A1 | 10/2002 | Racov |
| 2002/0153414 A1 | 10/2002 | Stoutenburg et al. |
| 2002/0165023 A1 | 11/2002 | Brosnan et al. |
| 2002/0169713 A1 | 11/2002 | Chang et al. |
| 2002/0178062 A1 | 11/2002 | Wright et al. |
| 2002/0190123 A1 | 12/2002 | Anvekar et al. |
| 2003/0004802 A1 | 1/2003 | Callegari |
| 2003/0004891 A1 | 1/2003 | Rensburg et al. |
| 2003/0023552 A1 | 1/2003 | Kight et al. |
| 2003/0055735 A1 | 3/2003 | Cameron et al. |
| 2003/0074328 A1 | 4/2003 | Schiff et al. |
| 2003/0115126 A1 | 6/2003 | Pitroda |
| 2003/0162565 A1 | 8/2003 | Al-Khaja |
| 2003/0186734 A1 | 10/2003 | LeMay et al. |
| 2003/0191711 A1 | 10/2003 | Jamison et al. |
| 2003/0200184 A1 | 10/2003 | Dominguez et al. |
| 2003/0212601 A1 | 11/2003 | Silva et al. |
| 2003/0218062 A1 | 11/2003 | Noriega et al. |
| 2003/0218066 A1 | 11/2003 | Fernandes et al. |
| 2003/0220884 A1 | 11/2003 | Choi et al. |
| 2003/0226042 A1 | 12/2003 | Fukushima |
| 2003/0228910 A1 | 12/2003 | Jawaharlal et al. |
| 2003/0229590 A1 | 12/2003 | Byrne et al. |
| 2003/0233317 A1 | 12/2003 | Judd |
| 2003/0233318 A1 | 12/2003 | King et al. |
| 2003/0234819 A1 | 12/2003 | Daly et al. |
| 2003/0236749 A1 | 12/2003 | Shergalis |
| 2004/0002383 A1 | 1/2004 | Lundy et al. |
| 2004/0010462 A1 | 1/2004 | Moon et al. |
| 2004/0014514 A1 | 1/2004 | Yacenda et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0049456 A1 | 3/2004 | Dreyer |
| 2004/0049458 A1 | 3/2004 | Kunugi et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0083170 A1 | 4/2004 | Bam et al. |
| 2004/0083171 A1 | 4/2004 | Kight et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0117302 A1 | 6/2004 | Weichert et al. |
| 2004/0118914 A1 | 6/2004 | Smith et al. |
| 2004/0128197 A1 | 7/2004 | Bam et al. |
| 2004/0139005 A1 | 7/2004 | Ganesan |
| 2004/0159700 A1 | 8/2004 | Khan et al. |
| 2004/0162058 A1 | 8/2004 | Mottes |
| 2004/0167853 A1 | 8/2004 | Sharma |
| 2004/0181463 A1 | 9/2004 | Goldthwaite et al. |
| 2004/0185881 A1 | 9/2004 | Lee et al. |
| 2004/0193464 A1 | 9/2004 | Szrek et al. |
| 2004/0199431 A1 | 10/2004 | Ganesan et al. |
| 2004/0199474 A1 | 10/2004 | Ritter |
| 2004/0215560 A1 | 10/2004 | Amalraj et al. |
| 2004/0215564 A1 | 10/2004 | Lawlor et al. |
| 2004/0225560 A1 | 11/2004 | Lewis et al. |
| 2004/0230489 A1 | 11/2004 | Goldthwaite et al. |
| 2004/0242208 A1 | 12/2004 | Teicher |
| 2004/0243490 A1 | 12/2004 | Murto et al. |
| 2004/0249766 A1 | 12/2004 | Ganesan et al. |
| 2004/0259626 A1 | 12/2004 | Akram |
| 2004/0267663 A1 | 12/2004 | Karns et al. |
| 2004/0267664 A1 | 12/2004 | Nam et al. |
| 2004/0267665 A1 | 12/2004 | Nam et al. |
| 2005/0015388 A1 | 1/2005 | Dasgupta et al. |
| 2005/0054438 A1 | 3/2005 | Rothschild et al. |
| 2005/0060261 A1 | 3/2005 | Remington et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0080634 A1 | 4/2005 | Kanniainen et al. |
| 2005/0086164 A1 | 4/2005 | Kim et al. |
| 2005/0097038 A1 | 5/2005 | Yu et al. |
| 2005/0103839 A1 | 5/2005 | Hewel |
| 2005/0108096 A1 | 5/2005 | Burger et al. |
| 2005/0109835 A1 | 5/2005 | Jacoby et al. |
| 2005/0125343 A1 | 6/2005 | Mendelovich |
| 2005/0125348 A1 | 6/2005 | Fulton et al. |
| 2005/0137978 A1 | 6/2005 | Ganesan et al. |
| 2005/0143163 A1 | 6/2005 | Yacenda |
| 2005/0149393 A1 | 7/2005 | Loef et al. |
| 2005/0153779 A1 | 7/2005 | Ziegler |
| 2005/0167488 A1 | 8/2005 | Higgins et al. |
| 2005/0174975 A1 | 8/2005 | Mgrdechian et al. |
| 2005/0177437 A1 | 8/2005 | Ferrier |
| 2005/0182714 A1 | 8/2005 | Nel |
| 2005/0184145 A1 | 8/2005 | Law et al. |
| 2005/0187873 A1 | 8/2005 | Labrou et al. |
| 2005/0203844 A1 | 9/2005 | Ferguson et al. |
| 2005/0209965 A1 | 9/2005 | Ganesan |
| 2005/0211764 A1 | 9/2005 | Barcelou |
| 2005/0215306 A1 | 9/2005 | O'Donnell |
| 2005/0216583 A1 | 9/2005 | Cole et al. |
| 2005/0222925 A1 | 10/2005 | Jamieson |
| 2005/0222961 A1 | 10/2005 | Staib et al. |
| 2005/0233797 A1 | 10/2005 | Gilmore et al. |
| 2005/0247777 A1 | 11/2005 | Pitroda |
| 2005/0261058 A1 | 11/2005 | Nguyen et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004656 A1 | 1/2006 | Lee |
| 2006/0006226 A1 | 1/2006 | Fitzgerald et al. |
| 2006/0026070 A1 | 2/2006 | Sun |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0163343 A1 | 7/2006 | Changryeol |
| 2006/0206436 A1 | 9/2006 | James et al. |
| 2007/0017976 A1 | 1/2007 | Peyret et al. |
| 2007/0030824 A1 | 2/2007 | Ribaudo et al. |
| 2007/0055785 A1 | 3/2007 | Stevens |
| 2007/0060284 A1 | 3/2007 | Yacenda |
| 2007/0083466 A1 | 4/2007 | Crowell et al. |
| 2007/0117609 A1 | 5/2007 | White et al. |

(56) References Cited

U.S. PATENT DOCUMENTS

| | | |
|---|---|---|
| 2007/0130085 A1 | 6/2007 | Zhu |
| 2007/0155489 A1 | 7/2007 | Beckley et al. |
| 2007/0156436 A1 | 7/2007 | Fisher et al. |
| 2007/0162337 A1 | 7/2007 | Hawkins et al. |
| 2007/0175984 A1 | 8/2007 | Khandaker et al. |
| 2007/0233615 A1 | 10/2007 | Tumminaro |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1 | 2/2008 | Rackley, III et al. |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0065485 A1 | 3/2008 | Hammond et al. |
| 2008/0071620 A1 | 3/2008 | Lowe |
| 2008/0079573 A1 | 4/2008 | Bloebaum et al. |
| 2008/0091528 A1 | 4/2008 | Rampell et al. |
| 2008/0091545 A1 | 4/2008 | Jennings et al. |
| 2008/0097844 A1 | 4/2008 | Hsu et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0167060 A1 | 7/2008 | Moshir et al. |
| 2008/0167106 A1 | 7/2008 | Lutnick et al. |
| 2008/0172331 A1 | 7/2008 | Graves et al. |
| 2008/0194311 A1 | 8/2008 | Cage et al. |
| 2008/0139306 A1 | 12/2008 | Lutnick et al. |
| 2009/0001159 A1 | 1/2009 | James et al. |
| 2009/0017893 A1 | 1/2009 | Carson |
| 2009/0037743 A1 | 2/2009 | Narayanaswami et al. |
| 2009/0042633 A1 | 2/2009 | Yacenda |
| 2009/0055296 A1 | 2/2009 | Nelsen |
| 2009/0076896 A1 | 3/2009 | DeWitt et al. |
| 2009/0093292 A1 | 4/2009 | Randhawa |
| 2009/0111378 A1 | 4/2009 | Sheynman et al. |
| 2009/0137304 A1 | 5/2009 | Yacenda |
| 2009/0144161 A1 | 6/2009 | Fisher |
| 2009/0163263 A1 | 6/2009 | Herndon et al. |
| 2009/0187491 A1 | 7/2009 | Bull et al. |
| 2009/0192928 A1 | 7/2009 | Abifaker |
| 2009/0197684 A1 | 8/2009 | Arezina et al. |
| 2009/0227320 A1 | 9/2009 | McBride |
| 2009/0239657 A1 | 9/2009 | Ryan et al. |
| 2009/0247281 A1 | 10/2009 | Voutes |
| 2009/0298427 A1 | 12/2009 | Wilkinson et al. |
| 2010/0062826 A1 | 3/2010 | Walker et al. |
| 2010/0063906 A1 | 3/2010 | Nelsen et al. |
| 2010/0069136 A1 | 3/2010 | Safaei et al. |
| 2010/0075735 A1 | 3/2010 | Luciano et al. |
| 2010/0082487 A1 | 4/2010 | Nelsen |
| 2010/0082490 A1 | 4/2010 | Rosenblatt et al. |
| 2010/0093421 A1 | 4/2010 | Nyman et al. |
| 2010/0130172 A1 | 5/2010 | Vendrow et al. |
| 2010/0151930 A1* | 6/2010 | Oram .................. G07F 17/329 463/17 |
| 2010/0203943 A1 | 8/2010 | Hughes |
| 2010/0222125 A1 | 9/2010 | Nyman et al. |
| 2010/0255902 A1* | 10/2010 | Goldstein ........... G07F 17/3241 463/29 |
| 2010/0264499 A1 | 10/2010 | Goodelle et al. |
| 2010/0293536 A1 | 11/2010 | Nikitin et al. |
| 2010/0312636 A1 | 12/2010 | Coulter et al. |
| 2011/0034229 A1 | 2/2011 | Guziel et al. |
| 2011/0034252 A1 | 2/2011 | Morrison et al. |
| 2011/0081958 A1 | 4/2011 | Hermann et al. |
| 2011/0105213 A1 | 5/2011 | Irwin et al. |
| 2011/0106698 A1 | 5/2011 | Isaacson et al. |
| 2011/0145044 A1 | 6/2011 | Nelsen et al. |
| 2011/0202419 A1 | 8/2011 | Mamdani et al. |
| 2011/0246284 A1 | 10/2011 | Chaikin et al. |
| 2011/0251892 A1 | 10/2011 | Laracey et al. |
| 2011/0258075 A1 | 10/2011 | Ciurea et al. |
| 2011/0282784 A1 | 11/2011 | Nelsen |
| 2011/0307377 A1 | 12/2011 | Nelsen et al. |
| 2012/0069471 A1 | 4/2012 | Comparelli et al. |
| 2012/0089468 A1 | 4/2012 | Guziel |
| 2012/0184354 A1 | 7/2012 | Brosnan et al. |
| 2012/0202571 A1 | 8/2012 | Stanek et al. |
| 2012/0244930 A1 | 9/2012 | Cage et al. |
| 2012/0264499 A1* | 10/2012 | Walker .................. G07F 17/32 463/19 |
| 2012/0276976 A1 | 11/2012 | Yoo et al. |
| 2013/0072280 A1 | 3/2013 | Yacenda |
| 2013/0073388 A1 | 3/2013 | Heath |
| 2013/0196733 A1 | 8/2013 | Cage et al. |
| 2013/0196734 A1 | 8/2013 | Cage et al. |
| 2013/0217462 A1 | 8/2013 | Cage et al. |
| 2013/0281190 A1 | 10/2013 | Cage et al. |
| 2013/0290121 A1 | 10/2013 | Simakov et al. |
| 2013/0304561 A1 | 11/2013 | Warner et al. |
| 2014/0006268 A1 | 1/2014 | Roberts et al. |
| 2014/0066194 A1 | 3/2014 | Cage et al. |
| 2014/0155172 A1 | 6/2014 | Stoilkovich et al. |
| 2014/0256422 A9* | 9/2014 | Saunders ................ A63F 13/79 463/29 |
| 2014/0274314 A1 | 9/2014 | Cage et al. |
| 2014/0378204 A1 | 12/2014 | Michel et al. |
| 2015/0238857 A1* | 8/2015 | Amaitis .............. G07F 17/3218 463/42 |
| 2015/0278845 A1 | 10/2015 | Sorem et al. |
| 2015/0279156 A1 | 10/2015 | Omar |
| 2016/0042600 A1* | 2/2016 | Bickley ............... G07F 17/3276 463/25 |
| 2016/0086447 A1 | 3/2016 | Cage et al. |
| 2016/0086453 A1 | 3/2016 | Cage et al. |
| 2016/0093137 A1 | 3/2016 | Gaddy |
| 2017/0076293 A1 | 3/2017 | Cage et al. |
| 2018/0096558 A1 | 4/2018 | Giunti |

FOREIGN PATENT DOCUMENTS

| | | |
|---|---|---|
| CN | 102184501 | 9/2011 |
| EP | 0950968 A1 | 10/1999 |
| EP | 1519332 A1 | 3/2005 |
| EP | 1587014 | 10/2005 |
| JP | 2002318951 A | 10/2002 |
| KR | 20010106187 A | 11/2001 |
| KR | 1020010106187 A | 11/2001 |
| KR | 20040028487 A | 4/2004 |
| KR | 20040052531 A | 6/2004 |
| KR | 1020040052502 A | 6/2004 |
| KR | 20040069294 A | 8/2004 |
| KR | 20050118609 A | 12/2005 |
| KR | 200901234M A | 12/2009 |
| WO | 2001099067 | 12/2001 |
| WO | 2004004280 | 1/2004 |
| WO | 2004012118 A1 | 2/2004 |
| WO | 2005111882 A1 | 11/2005 |
| WO | 2007049283 | 5/2007 |
| WO | 2008092034 | 7/2008 |
| WO | 2012048313 | 8/2012 |
| WO | 2013026997 | 2/2013 |

OTHER PUBLICATIONS

International Search Report and the Written Opinion dated Nov. 20, 2014 of International Patent Application No. PCT/US2014/022877.
Supplemental extended Search Report dated Feb. 27, 2015 in European patent application No. 13744174.7.
Vlugt, Erik: "NFC: The "Presence + Intention" Bridge: The Verifone Blog", Apr. 11, 2011, XP55170410.
Tainton, Tom: "Smart Card News", Jun. 1, 2011, XP55168606.
International Search Report and Written Opinion from PCT/US2012/061744 dated Jun. 10, 2014.

(56) References Cited

OTHER PUBLICATIONS

International Search Report and Written Opinion from PCT/US2008/051955 dated Aug. 1, 2008.
International Search Report and Written Opinion of PCT/US2013/024475 dated Apr. 12, 2013.
Office Action dated Mar. 25, 2016 in Chinese Patent Application No. 201380057172.6.
Partial Supplementary European Search Report dated Aug. 26, 2015 of European Patent Application No. 12844370.2.
Office Action dated Jul. 27, 2013 in Chinese Patent Application No. 200880009639.9.
Extended European search report dated Dec. 22, 2015 of European patent application 12844370.2.
Substantive Examination Report dated Mar. 2, 2016 in Philippines patent application No. 1/2014/500913.
Notice of Acceptance dated Dec. 1, 2015 in Australia Patent Application No. 2012328881.
Notification of Grant dated Oct. 16, 2015 in Singapore Patent Application No. 11201401751V.
Acceptance of Complete Specification dated May 14, 2015 in South Africa Patent Application No. 2014/03419.
Extended European search report dated Sep. 23, 2016 in European patent application 14770551.1.
Extended European search report dated Jan. 21, 2016 in European patent application 13835153.1.
U.S. Appl. No. 11/734,207.
U.S. Appl. No. 13/280,196.
U.S. Appl. No. 13/757,512.
U.S. Appl. No. 13/829,776.
U.S. Appl. No. 13/839,469.
U.S. Appl. No. 13/839,558.
U.S. Appl. No. 13/842,709.
U.S. Appl. No. 14/018,276.
U.S. Appl. No. 14/856,421.
U.S. Appl. No. 14/958,715.
U.S. Appl. No. 14/958,720.
International Preliminary Report on Patentability dated Mar. 10, 2015 of International Patent Application No. PCT/US2013/058078.
International Preliminary Report on Patentability dated Sep. 15, 2015 of International Patent Application No. PCT/US2014/022877.
International Preliminary Report on Patentability dated Jun. 10, 2014 of International Patent Application No. PCT/US2012/061744.
International Preliminary Report on Patentability dated Jul. 28, 2009 of International Patent Application No. PCT/US2008/051955.
International Preliminary Report on Patentability dated Sep. 15, 2015 of International Patent Application No. PCT/US2013/024475.
EP Register of European Patent Application No. 14770551.1.
EP Register of European Patent Application No. 13835153.1.
EP Register of European Patent Application No. 08713986.1.
AusPat of Australian Patent Application No. 2008207887.
AusPat of Australian Patent Application No. 2012328881.
Office Action dated May 12, 2016 for Chinese Patent Application No. 2012800064355.
EP Register of European Patent Application No. 12844370.2.
EP Register of European Patent Application No. 13744174.7.
Office Action dated Sep. 7, 2016 for Chinese Patent application No. 201380018680.
U.S. Appl. No. 15/614,486.
U.S. Appl. No. 15/614,490.
Substantive Examination Report dated Sep. 5, 2017 in Philippines patent application No. 1/2015/500472.
U.S. Appl. No. 15/055,866.
International Search Report of PCT/US2018/018071 dated Jul. 16, 2018, 10 pages.
Written Opinion of the International Searching Authority of PCT/US2018/018071 dated Jul. 16, 2018, 19 pages.
U.S. Appl. No. 15/818,041.
U.S. Appl. No. 15/818,569.
U.S. Appl. No. 15/818,603.
ISA Korea, International Search Report of PCT/US2009/056118, dated Apr. 19, 2010, 3 pages.
ISA Korea, International Search Report of PCT/US2009/058111, dated May 26, 2010, 3 pages.
ISA Korean Intellectual Property Office, International Search Report of PCT/US2010/060875, dated Jul. 29, 2011, 10 pages.
ISA United States Patent and Trademark Office, International Search Report of PCT/US2008/073910, dated Nov. 10, 2008.
Nelsen, D.A. and Arifin, Leslie, "Systems and Methods for Authentication of a Virtual Stored Value Card," U.S. Appl. No. 12/554,792, filed Sep. 4, 2009, 67 pages.
Nelsen, D.A., "Systems and Methods for Managing and Using a Virtual Card," U.S. Appl. No. 12/562,091, filed Sep. 17, 2009, 60 pages.

* cited by examiner

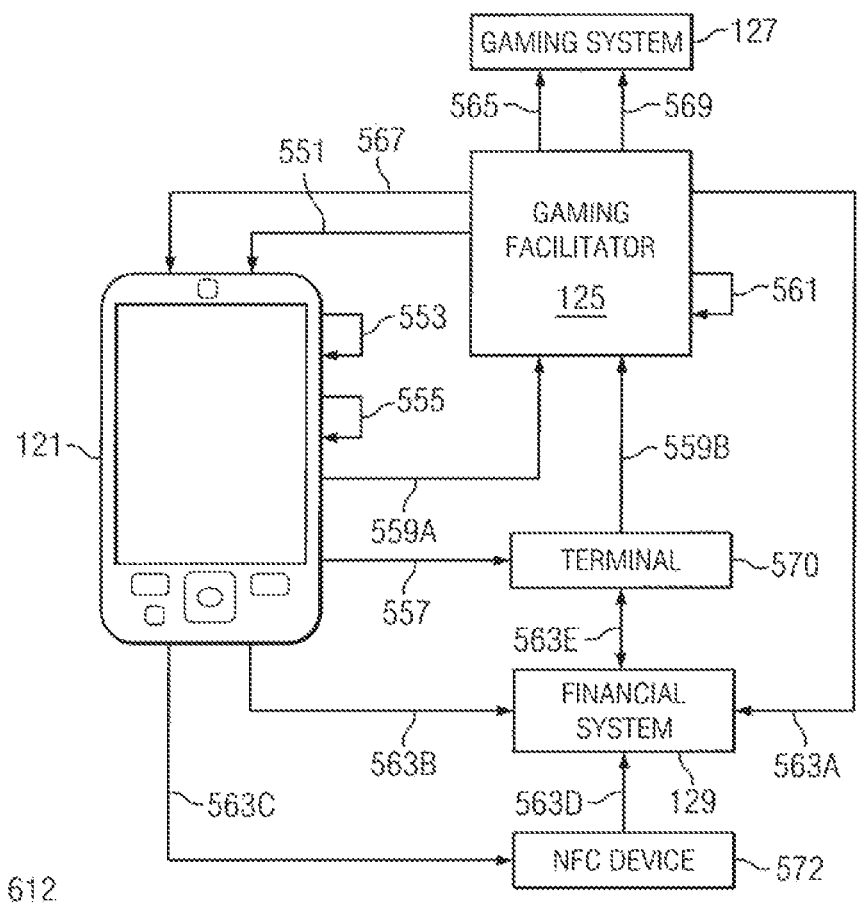
FIG. 5B
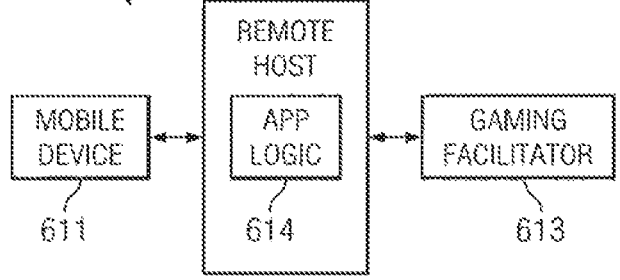
FIG. 6A
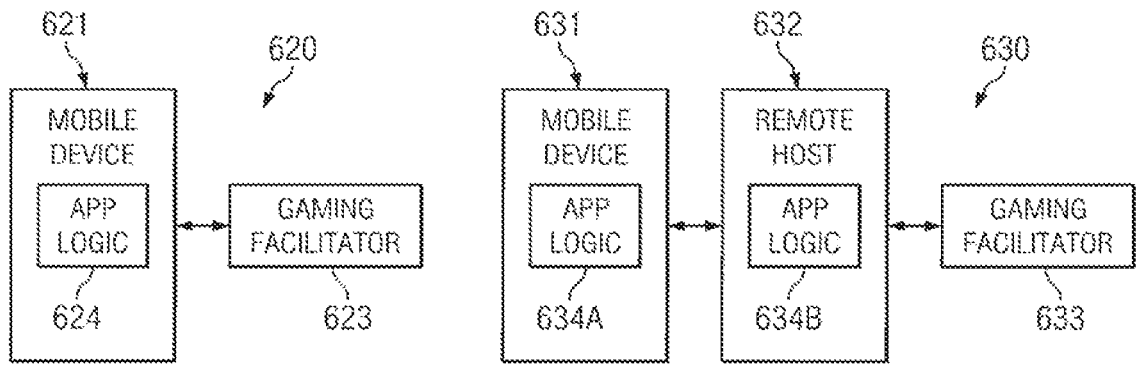
FIG. 6B
FIG. 6C

PROCESSING OF A USER DEVICE GAME-PLAYING TRANSACTION BASED ON LOCATION

CROSS-REFERENCE TO RELATED APPLICATIONS

The application is a continuation of, and claims priority to U.S. patent application Ser. No. 15/818,041, filed Nov. 20, 2017, issued as U.S. Pat. No. 10,127,764 on Nov. 13, 2018, which is a continuation of, and claims priority to U.S. patent application Ser. No. 15/614,486, filed Jun. 5, 2017, issued as U.S. Pat. No. 9,824,340 on Nov. 21, 2017, which is a continuation of, and claims priority to, U.S. patent application Ser. No. 14/958,715 filed on Dec. 3, 2015, issued as U.S. Pat. No. 9,672,687 on Jun. 6, 2017, which is a continuation of, and claims priority to, U.S. patent application Ser. No. 14/018,276 filed on Sep. 4, 2013, issued as U.S. Pat. No. 9,227,136 on Jan. 5, 2016, which claims priority to U.S. Provisional Patent Application No. 61/696,533 filed on Sep. 4, 2012, all the disclosures of which are hereby incorporated by reference in their entirety.

TECHNICAL FIELD

This disclosure generally relates to game play systems.

BACKGROUND

Many governments have passed laws permitting lottery games to be legalized within their borders. These laws are due to the public support for this style of entertainment. Currently, these games are presented through specific manned terminals that connect to lottery operators—corporations responsible for running the lottery games. While these games have proven to be popular, a large segment of the population does not participate. This is due to many factors including a lack of desire to interact with personnel running the game kiosks, the inconvenience of the manned terminals, the concern over losing a ticket, and, more recently, the lack of cash to play the games as many people are only using payment cards for purchases.

In addition, due to regulatory restrictions, the sale of lottery products is restricted to be within the borders of the government regulating the lottery games. Therefore, existing sales solutions used on mobile devices such as handheld devices and smart phones are not appropriate for the sale of the lottery games because they lack assurances that the mobile device is located within the borders of the government regulating the lottery game.

SUMMARY

In some embodiments, a device is provided for processing game-playing transactions. The device comprises a first communication interface; a second communication interface; and a processor configured to: receive a first request from a user of the device, the first request being associated with a game; conduct, over the first communication interface, a first transaction, the first transaction comprising transmission or reception of first information over the first communication interface, and send, over the second communication interface, a second request associated with the game. The first request or the second request is processed based on: determining a location associated with conducting the first transaction or sending the second request, and determining the location is an approved location associated with the game.

In some embodiments, the first communication interface comprises at least one of a Bluetooth interface, a near-field communication (NFC) interface, or a code-based interface.

In some embodiments, the second communication interface comprises a Wi-Fi or cellular interface.

In some embodiments, the first communication interface and the second communication interface are the same communication interface.

In some embodiments, the second request comprises at least one of a purchase request, the first request, or the first information.

In some embodiments, the location is determined based on global positioning system (GPS) coordinates of the device.

In some embodiments, the device comprises a mobile device or a non-mobile device.

In some embodiments, the second request is approved further based on determining a period of validity associated with the first information has not expired.

In some embodiments, the second request is approved further based on: determining a gaming authority associated with the game; and determining the user is located in an approved jurisdiction associated with the gaming authority for the game.

In some embodiments, the second communication interface is associated with longer range communication compared to the first communication interface.

In some embodiments, the location is determined by at least one of the device or by a second device that receives the second request from the device.

In some embodiments, a method is provided for processing game-playing transactions. The method comprises receiving information associated with a game-playing transaction conducted between a user device and a game-playing terminal, wherein the game-playing transaction is associated with a request for playing a game; determining a location of the user device associated with the game; determining the user device is located in an approved location associated with the game; and processing the game-playing transaction based on determining the user device is located in the approved location associated with the game. The game-playing transaction is conducted on a first communication interface, and the information associated with the game-playing transaction is received on a second communication interface.

In some embodiments, the first communication interface comprises at least one of a Bluetooth interface, a near-field communication (NFC) interface, or a code-based interface.

In some embodiments, the game comprises a lottery game.

In some embodiments, the method further comprises determining a period of validity associated with the information has not expired, and processing the game-playing request based on determining the period of validity associated with the information has not expired.

In some embodiments, the method further comprises processing the game-playing transaction based on: determining a merchant associated with the location of the user device or the game-playing terminal, cross-referencing a list of approved merchants associated with the location of the user device or the game-playing terminal; and determining the merchant is present on the list of approved merchants.

In some embodiments, the game-playing terminal comprises either an electronic game-playing terminal or a non-electronic game playing terminal.

In some embodiments, a device is provided for processing game-playing transactions. The device is configured to: receive information associated with a game-playing transaction conducted between a user device and a game-playing terminal, wherein the game-playing transaction is associated with a request for playing a game using the user device; and process the game-playing transaction based on determining the user device is located in an approved location associated with the game, wherein the location of the user device is determined either by the device or the user device. The game-playing transaction is conducted on a first communication interface, and the information is received on a second communication interface.

In some embodiments, the first communication interface comprises at least one of a Bluetooth interface, a near-field communication (NFC) interface, or a code-based interface.

In some embodiments, the game-playing transaction comprises a game-requesting transaction or a game-purchasing transaction. In some embodiments, a non-transitory computer-readable medium comprising code may be provided for performing or executing the various methods described herein.

According to another embodiment, a non-transitory computer readable medium may be encoded thereon with a program that when executed by a processor of a user device, causes the processor to perform a method that may comprise receiving a game play request from a user, obtaining barcode information associated with a barcode at a location, and sending a gaming request including the barcode information and associated with the game play request over a wireless network to a gaming facilitator.

These and other advantages of the present disclosure will become apparent to those skilled in the art from the following detailed description, the accompanying drawings, and the appended claims.

BRIEF DESCRIPTION OF THE DRAWINGS

FIGS. 5A and 5B are schematic diagrams illustrating processes for game play.

FIGS. 6A, 6B and 6C are schematic diagrams illustrating input systems.

DETAILED DESCRIPTION

The disclosed systems and methods make lottery games accessible to a larger segment of the population by providing an end-to-end lottery solution for integrated game play and sale of lottery products on, for example, hand held devices and smart phones using barcode technology. A player operates an application on a mobile device, which may be provided for download or supplied with the device, that allows them to select lottery games and ticketing options. In some embodiments, the selection can be made at any time and location. The selections are recorded, for example in a virtual shopping cart, by the lottery application on the mobile device. The player purchases these recorded items at locations that are, for example, pre-approved by a gaming facilitator and/or a gaming authority. The locations are equipped to verify the presence of the mobile device at the location using a barcode technology. Redemption of winning plays can be automatically deposited into an account associated with the player or at a retail location by use of, for example, a barcode sent to the mobile device.

The use of barcode technology with an application distributed to mobile devices allows for the following exemplary advantages:

Issuing and managing a trusted execution environment.

Assigning trusted area within a trusted execution environment to a specific service.

Managing keys for a trusted execution environment.

Securely downloading lottery applications to enabled mobile phones, for example by scanning a barcode and directing the user to a secure website to download the application.

Personalizing applications.

Locking, unlocking and deleting the lottery application according to requests from a user or service provider.

Providing secure logging and accounting settlement of all lottery transactions.

The gaming facilitator enables secure data storage of lottery transactions at the device level using, for example, a Universal Integrated Circuit Card (UICC) through processing and transaction confirmation.

The UICC is a physically secure device, an integrated circuit (IC) card, or smart card, that can be inserted and removed from terminal equipment or a mobile device. The UICC may contain one or more applications and may be referred to using different terminology in different territories. A Subscriber Identity Module (SIM) is an application on the UICC containing a mobile subscriber's unique identity.

Figure 1:
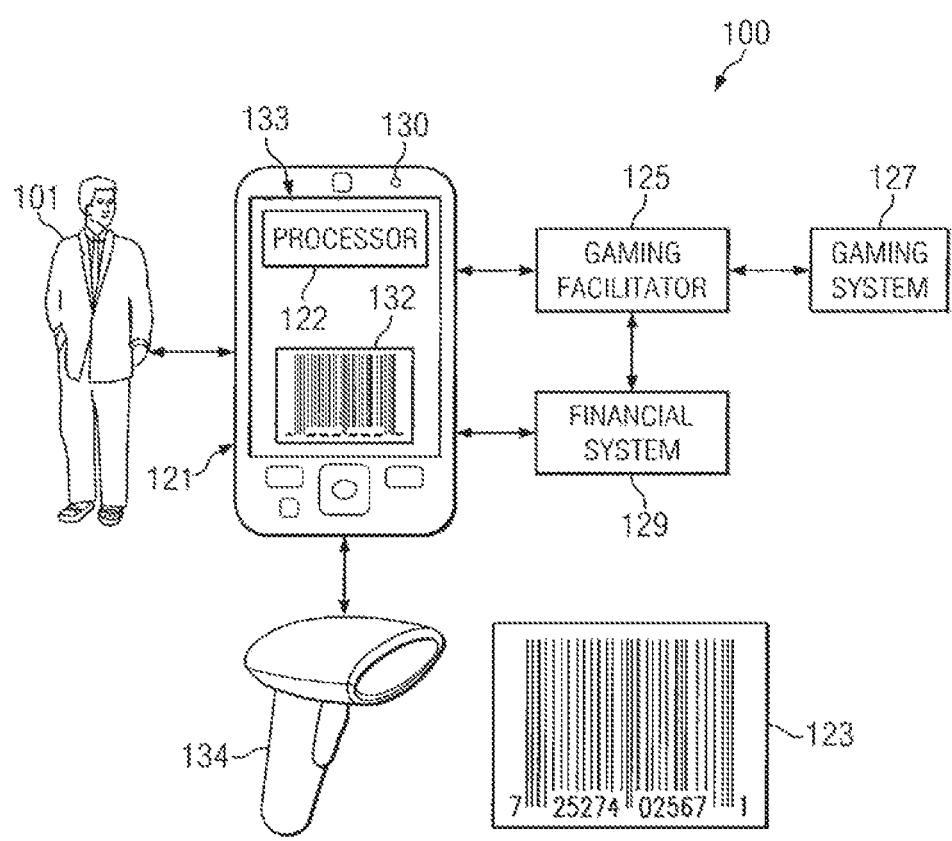
FIG. 1 is a schematic diagram illustrating a game play system.

FIG. 1 is a schematic diagram illustrating a representative embodiment of a game play system 100. A user 101 may interact with a mobile device 121. The mobile device 121 may be, for example, a handheld device or smart phone that is already familiar to the user 101 and presents a familiar interface to lottery games. The mobile device 121 may include a processor 122 that is configured to execute programming that may be stored on and/or provided to the mobile device 121. The mobile device 121 is equipped to use barcode technology thereby being able to read a barcode 123 using, for example, a camera 130 of the mobile device 121. Alternatively, or in addition, the mobile device 121 may be configured to display a barcode 132 on a display 133 of the mobile device 121 to be read by barcode reader 134.

By way of example, the barcode 123 or barcode reader 134 may be located at an ATM, a gas pump, or any other retail location. The mobile device 121 may be in communication with the gaming facilitator 125, which may be in communication with the gaming system 127. The mobile device 121 may also be in communication system with the financial system 129 directly and/or through the gaming facilitator 125. The financial system 129 may include, but is not limited to, payment processors, issuer banks, acquirer banks, payment rails, credit networks, etc. The gaming system 127 may include, but is not limited to, a gaming authority, a gaming operator (for example, state lottery operators), a gaming commission (for example, a state lottery commission), etc.

According to another embodiment, the game could be a location-specific game such as Keno or Bingo. In this embodiment, the gaming system 127 would be the computer or system that draws the number for game play. The gaming facilitator 125 would allow the user 101 to interact with the gaming system 127 at the facility. Thus, a user 101 could select a series of numbers on the mobile device 121 and store those numbers for the next gaming play. At the appropriate time, the user 101 would take the mobile device 121 to the barcode reader 134 to communicate the numbers to the gaming system 127 for play. For example, the user 101 may select a button displayed on the display 133 that causes the mobile device 121 to generate a barcode that encodes the numbers and display the barcode on the screen. The barcode reader 134 can then obtain the numbers by reading the barcode. Alternatively, the mobile device 121 may communicate the numbers to the gaming facilitator 125 in association with a reference identification assigned by the mobile device 121 or the gaming facilitator 125 for the game play. The barcode displayed by the mobile device 121 encodes this reference identification thereby enabling the retrieval and identification of the numbers when the barcode reader 134 reads the barcode, which includes the encoded reference identification.

Communications Exchange Server

To sell gaming (or more particularly lottery) tickets through point of sale devices, a communication network is used for communications between a gaming facilitator and gaming partners. Gaming partners are partners that the gaming facilitator interacts with to complete a gaming transaction, such as the gaming system or the financial system. This communication network may have desirable characteristics such as being designed to be secure, reliable, and fast. In an embodiment, each gaming partner may have their own protocol for communicating with and between their systems, servers, and remote devices. Some gaming partners utilize public protocols (e.g., ISO8583) while other gaming partners have generated their own proprietary protocols. To ensure the security of each partner's data and protocols, a server for exchanging communications between a gaming facilitator and a gaming partner may be used.

Figure 2A:
FIG. 2A is a schematic diagram illustrating a communications exchange server.

FIG. 2A is a schematic diagram of a communications exchange server 200 that exchanges communications between a gaming facilitator 217 and a gaming partner 201. The communications 203, 215 may include transaction-specific gaming information. In some embodiments, the communications exchange server 200 is an inbound communications server (as shown) for receiving and sending communications at a gaming facilitator 217 to and from a gaming partner 201. The communications 215 between the gaming facilitator 217 and the communications exchange server 200 are multiple connections which represents a series of parallel requests. The communications 203 between the communications exchange server 200 and the gaming partner 201 are a single connection which represents a series of serialized requests. In those embodiments, the communications exchange server may be located at the gaming facilitator.

In some embodiments, the communications exchange server 200 is an outbound communications server (not shown) for receiving and sending communications at a gaming facilitator 217 to and from a gaming partner 201. The communications between the gaming facilitator 217 and the communications exchange server 200 are a single connection which represents a series of serial requests. The communications between the communications exchange server 200 and the gaming partner 201 are multiple connections which represent a series of parallel requests. In those embodiments, the communications exchange server may be located at a gaming partner's site, for example, at a Lottery Operator. A gaming facilitator may send a single request to a communications exchange server that a Lottery Operator send a number of tickets (e.g., "give me 20 tickets"). The communications exchange server may turn that request into a number of requests for one ticket (e.g., 20 requests of, "give me one ticket"), resulting in a number of tickets (e.g., 20 tickets) being generated.

Figure 2B:
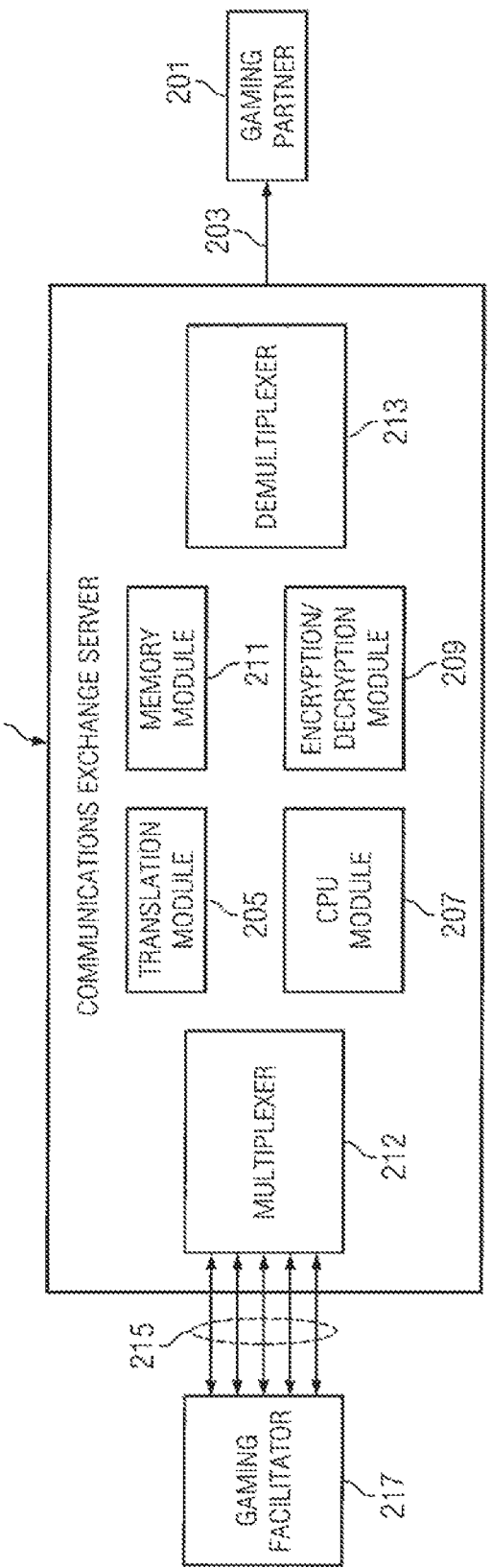
FIG. 2B is a schematic diagram illustrating a communications exchange server.

FIG. 2B is a more detailed schematic diagram of a communications exchange server 200 that exchanges communications between a gaming facilitator 217 and a gaming partner 201. The device 200 may include a translation module 205, encryption and decryption module 209, memory module 211, processing (CPU) module 207, multiplexer 212, and demultiplexer 213. The translation module 205 may translate communications between a gaming facilitator 217 and a gaming partner 201 by translating between a communication protocol used by the gaming partner 201 (e.g., a proprietary format of the gaming partner 201) and a communication protocol used by the gaming facilitator 217 (e.g., a proprietary format of the gaming facilitator 217). The encryption and decryption module 209 may encrypt and/or decrypt communications 215 between the gaming facilitator 217 and gaming partner 201. For example, data arriving at connection 215 from the gaming facilitator 217 may be encrypted. The encryption and decryption module 209 may decrypt the data such that it can be processed by the communications exchange server at the processor 207. Encryption keys may be used and may be updated at arbitrary times. Further, it may be desired that outgoing data at connection 215 to the gaming facilitator 217 or at connection 203 to the gaming partner 201 be encrypted before it is sent. Accordingly, the encryption and decryption module 209 may encrypt the data according to encryption protocols used by the gaming partner 201 and/or gaming facilitator 217. The memory module 211 may store information from the communications 203, 215 between the gaming facilitator 217 and gaming partner 201. The memory module 211 may also store gaming information. In an embodiment, the memory module 211 is a cache for storing gaming information and Bank Information. The cache 211 may store non-transaction specific gaming information. The cache 211 may also store game-related logic or a portion of game-related logic. The memory module 211 may also be program memory including logic or instructions accessible by the processor module 207. The processing module 207 may process the communications 203, 215 between the gaming partner 201 and the gaming facilitator 217. The translation module 205, encryption and decryption module 209, memory module 211, and processing module 207 are communicatively connected.

As discussed above, the communications exchange server 200 may be considered as an inbound or an outbound communications server. Inbound communications at connection 215, from one or more gaming partners 201 to gaming facilitator 217 may be multiplexed by the multiplexer 212. Outbound communications at connection 203 from the gaming facilitator 217 to the one or more gaming partners 201 may be demultiplexed by the demultiplexer 213.

FIG. 2B depicts a single translation module 205, memory module 211, CPU module 207, encryption and decryption module 209, and communications exchange server 200 for simplicity purposes only. At any point of connection between a gaming facilitator 217 and a gaming partner 201, multiple communications exchange servers 200 may be used for a variety of reasons including, but not limited to, redundancy, speed or efficiency of the system, failure diagnostics, ease of system upgradeability, system back-ups, network monitoring, etc. Further, each communications exchange server 200 may include multiple of any modules in the server 200. For example, in some embodiments, the communications exchange server 200 includes multiple memory modules 211 and multiple CPU modules 207. The communications exchange server 200 may be made of one or more machines, one or more motherboards, one or more memory modules, etc.

In an embodiment, the communications exchange server 200 is a computer that translates the gaming partner's communication protocol into a gaming facilitator specific protocol, thereby substantially eliminating the exposure of the partner's protocol to an outside entity. A communications exchange server 200 may be placed at a gaming partner's data center, either inside or outside of the gaming partner's firewall depending upon a gaming partner's preference. The communications exchange server 200 connects to gaming facilitator data centers over a gaming facilitator provided connection. In an embodiment, the gaming facilitator provided connection is a high speed, private connection (e.g., an MPLS connection). While this type of connection provides some inherent security, communications to and from the gaming facilitator may be encrypted to provide an additional layer of protection.

Non-transaction specific information (images, game rules, game information, etc.) may be cached on the device 200 in memory module 211, which allows for rapid access to cached data. For transaction specific information, data may be passed from the gaming partner 201 to the communications exchange server 200 which then encrypts the data and passes the request to a gaming facilitator 217 via a gaming facilitator provided connection.

The communications exchange server 200 may be used with a variety of gaming partners 201 including, but not limited to, lottery authorities, banking systems, and other payment systems. Further, the communications exchange server 200 may be located at a gaming partner location or at a gaming facilitator location.

User Registration

In an embodiment, a gaming facilitator system may include a user registration server. The user registration server allows users to register with the gaming facilitator system. Registering may allow users to check to see their play history, set spending limits, to select favorite numbers to be played, and to configure how they wish to be notified of their play status. In an embodiment, users may have an online account with the gaming facilitator system in which they may register, configure and make selections for their account with the gaming facilitator system.

Information identifying the registration of the associated information (the play history, spending limits, favorite numbers, notification configuration, etc) may be stored on the gaming facilitator system or on the mobile device 121 as a part of or in association with a gaming application stored on the mobile device 121.

Play Overview

Figure 3:
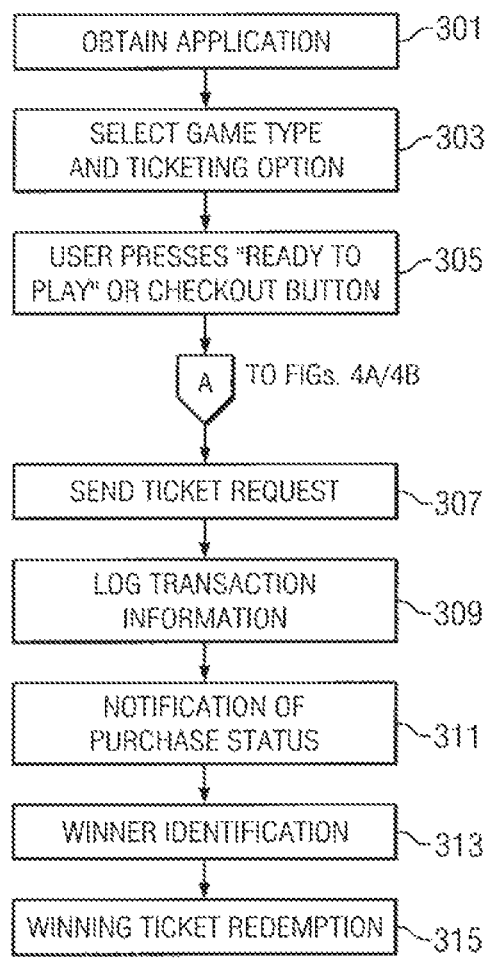
FIG. 3 is a flow diagram illustrating a process for a game play.

FIG. 3 is a high-level flow diagram illustrating a process for a gaming system transaction such as a lottery transaction. At action 301, the mobile device 121 obtains the gaming application. The application may be obtained directly or indirectly from the gaming facilitator 125. The gaming application can be obtained at anytime prior to gaming purchase.

The action 301 may be omitted if the mobile device already has the gaming application. For example, the gaming application may be preloaded on the mobile device 121 at the time of purchase of the mobile device 121.

At action 303, the user 101 selects a game type and ticketing option for gaming play. Game types include but are not limited to lottery play including draw, instant, and any other games offered by the jurisdiction's gaming authority. Other games may include location-specific games, such as Keno or Bingo. The jurisdiction's gaming authority may limit the available game types to approved game types. The selecting of ticketing options may include a number of tickets, numbers played, etc.

In some embodiments, the user 101 can select the game type and ticketing options at any time and in any location even prior to entering an approved retail location. In these embodiments, the gaming application may store the selected game type and ticketing options in, for example, a virtual shopping cart to be recalled at a later time to complete the transaction. The gaming application may also record previous selections and favorite selections such as favorite numbers to allow easier selection by the user 101.

At action 305, the end user presses a "ready to play" or checkout button in the mobile application. The game play system 100 verifies the location of the mobile device 121 and facilitates the user 101's gaming purchase using a method such as those described in FIGS. 4A and 4B.

Figures 4A, 4B:
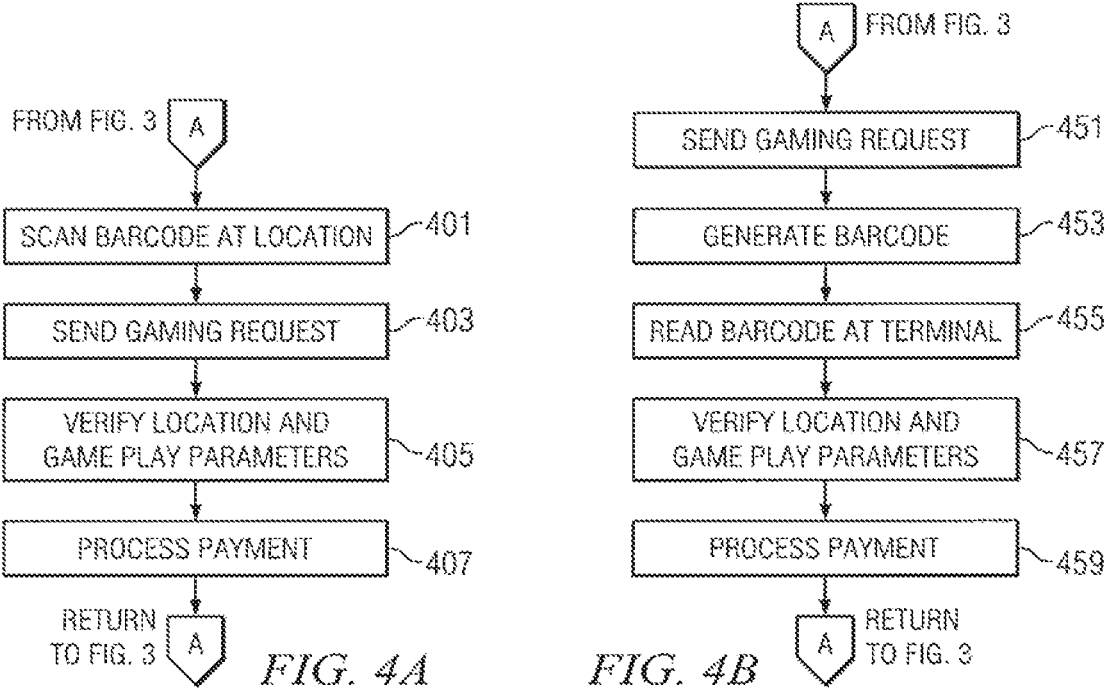
FIGS. 4A and 4B are flow diagrams illustrating methods for verifying the location of a mobile device.

FIG. 4A is a flow diagram illustrating a first exemplary method for verifying the location of the mobile device 121 and facilitating the user 101's gaming purchase.

At action 401, the gaming application prompts the user to scan a barcode at the location. The barcode may be scanned by a peripheral device attached to the mobile device 121 or by the camera 130 of the mobile device 121. The barcode may be a static barcode displayed at the location, for example on a poster or on a gas pump, or a dynamic barcode generated by a device, such as an ATM or a display incorporated in a gas pump, at the location. The barcode may be valid only for a period of time preventing the reuse of an old barcode at another location.

At action 403, the gaming application sends a gaming request including the selected game type and ticketing option along with the scanned barcode information to the gaming facilitator 125 using a mobile network such as Wi-Fi or CDMA/GSM. The scanned barcode information may include the barcode itself as an image file or as information encoded within the barcode that is decoded by the gaming application prior to sending the request.

At action 405, the gaming facilitator 125 processes a location verification of the mobile device 121, checks game availability, play limits and other lottery game play parameters. Location verification can be performed by a variety of means. According to one embodiment, the merchant may be required to be included on a list of pre-approved merchants to vend gaming tickets at the location. This list can be maintained by an appropriate authority, such as a facilitator or gaming authority. The gaming facilitator 125 cross-references the scanned barcode information to determine if the scanned barcode information corresponds with the location. The gaming facilitator 125 may also cross-reference a period of validity associated with the scanned barcode information to confirm that the scanned barcode is a recent and valid barcode.

According to another embodiment, location verification can be performed by other technology within the mobile device, such as GPS or radio tower triangulation. Ultimately, most gaming facilitators will need to take sufficient steps to confirm that the purchaser of the tickets is physically located within the jurisdiction of the gaming authority to avoid any legal complications associated with selling gaming tickets outside of the jurisdiction of the gaming authority.

At action 407, the gaming facilitator 125 processes transaction payment through, for example, an integrated standardized ticketing system with eWallet platforms or a direct gateway to payment processing partners. The mobile application may also process payment using other methods at a retail location, such as through the use of a Near Field Communications (NFC) Transaction Anchor Point (TAP). In some embodiments, the gaming facilitator 125 communicates with the payment processing partners to obtain payment.

FIG. 4B is a flow diagram illustrating a second exemplary method for verifying the location of the mobile device 121 and facilitating the user 101's gaming purchase.

At action 451, the gaming application sends a gaming request including the selected game type and ticketing option to the gaming facilitator 125 using a mobile network such as Wi-Fi or CDMA/GSM. The gaming request is identifiable based on content or a reference identifier assigned by the gaming application or the gaming facilitator 125. Thus, communication between the mobile device 121 and the gaming facilitator 125 may be one or two way. Note that as explained below, this step is optional in some embodiments.

At action 453, the gaming application generates a barcode encoding the reference identifier and displays the barcode on the display 133.

At action 455, the user presents the displayed barcode to a terminal at the location. The terminal may be, for example, an ATM machine, a gas pump, or a stand alone device. The terminal reads the barcode displayed on the mobile device 121 and sends a notification to the gaming facilitator 125 that the barcode was read at the location. The terminal may send an image of the barcode or information encoded by the barcode that is decoded by the terminal.

In another embodiment, the barcode generated by the mobile application includes some or all of the information included in the gaming request, which may reduce the amount of information that is sent from the mobile device 121 to the gaming facilitator 125 with a larger portion of the information in the gaming request then being sent by the terminal that reads and decodes the barcode to the gaming facilitator. In the case where all of the information in the gaming request is encoded in the barcode, it is not necessary for the mobile device 121 to itself send any information to the gaming facilitator 125 (the information being sent by the terminal reading the barcode) nor is the reference identifier needed. The mobile device 121 may also transmit information to the terminal over a short range wireless connection such as WiFi or Bluetooth to reduce the amount of information encoded in the barcode.

At action 457, the gaming facilitator 125 processes a location verification of the terminal if needed or required by the gaming system to verify eligibility of play at the location of the terminal, checks game availability, play limits and other lottery game play parameters.

At action 459, the gaming facilitator 125 processes transaction payment through, for example, an integrated standardized ticketing system with eWallet platforms or a direct gateway to payment processing partners. The mobile application may also process payment using other methods at a retail location, such as through the use of a Near Field Communications (NFC) transaction anchor point (TAP). In some embodiments, the gaming facilitator 125 communicates with the payment processing partners to obtain payment.

Returning now to FIG. 3, at action 307, upon payment authorization, the gaming facilitator 125 sends the ticket request to a computerized gaming system (CGS), such as gaming system 127. The gaming system may use a Random Number Generator (RNG) to produce the gaming play. In an embodiment using a "Virtual Instant Ticket," the RNG may not be used but the purchase will be sent to the CGS for processing and balancing. The gaming system 127, in communication with the gaming facilitator 125, verifies and completes the gaming transaction. According to another embodiment, pre-existing or favorite numbers can be entered or stored in the mobile device 121 or at the gaming facilitator 125. These numbers are sent to the gaming system 127 at step 307.

At action 309, the gaming facilitator 125 sends the gaming transaction information to the Internal Control System (ICS) of the gaming system 127 for independent logging. This action is not always requested and may not be present in some embodiments.

At action 311, the gaming facilitator 125 sends a notification of the purchase status to the gaming application. This notification may include, for example, numbers played, ticket serial number, date of draw, and payment authorization code along with other transaction specific information. In some embodiments the notification includes a numeric redemption code, a scannable barcode such as a QR code, or any other type of redeemable code that can be securely sent to the mobile application along with the notification. The barcode or redemption code can be used after a draw to check and claim winning numbers at an existing gaming/lottery terminal or retail location.

In the case where the transaction was not able to be completed, information notifying of the failure to complete may be sent to the mobile device 121. The notification may include other information associated with the failure, for example, what exception caused the failure.

In some embodiments, automated paperless receipts are provided to indicate numbers and games played. This notification may be sent via multiple methodologies including email, wireless delivery to mobile devices utilizing SMS text or device specific applications, RSS feed, or feeds into Twitter, Facebook or other social media accounts.

The notification may also include an automated remote notification that may be sent to the user 101 indicating play status (winner, winner of a certain amount of money, winner with manual redemption, non-winner, winning numbers, what the winning numbers were if the game was lost, game jackpots, game statistics, and other statistics). Notifications may be sent directly to the user 101 through the gaming application as well as via wireless delivery to a mobile device or email address using, for example, SMS text, email, RSS feed to Twitter, Facebook or other social media account, through device specific apps (i.e. iPhone, BlackBerry, or PDA apps) and, through automated lottery system web sites.

Redemption

When the user 101 wins a game, the user 101 will want to redeem his or her winnings. At action 313, a winner identification interface of the mobile application utilizes transaction data to query data from the gaming facilitator 125 to find winning ticket numbers. The data may be separated into three categories: non-winning tickets, winning tickets available for auto-redemption, and winning tickets available for manual claims. An additional winner verification system that a lottery facilitator may provide may be used by a game administrator to verify the integrity of tickets and to validate that a presented ticket is a winner for items that are manually claimed. The gaming facilitator 125 obtains the queried data from the gaming system 127 and provides it to the mobile application.

At action 315, the mobile application facilitates the redemption of winnings. Redemption may be completed using a variety of methods selected based on, for example, a selection of a preferred method by the user 101 or the amount of the winnings.

As a first example, the mobile application may provide for the display of the barcode received in the notification in connection with action 311. A retail location can then read the barcode to verify the win and provide the winnings.

As a second example, the winnings are automatically deposited to an account associated with the user 101. In some embodiments, the user 101 may tap the mobile device 121 to a NFC TAP to initiate a transfer of funds through financial system 129. An eWallet system may also be accessed for an auto-deposit of winning tickets through a point of sale terminal, debit, and/or credit network to allow for the redemption of winning tickets under a taxable or manually verifiable limit via a pin-less debit card or credit card transaction. A unique terminal number may be used for this transaction, and a pin or card may or may not be used for completion of the transaction.

Figure 5A:
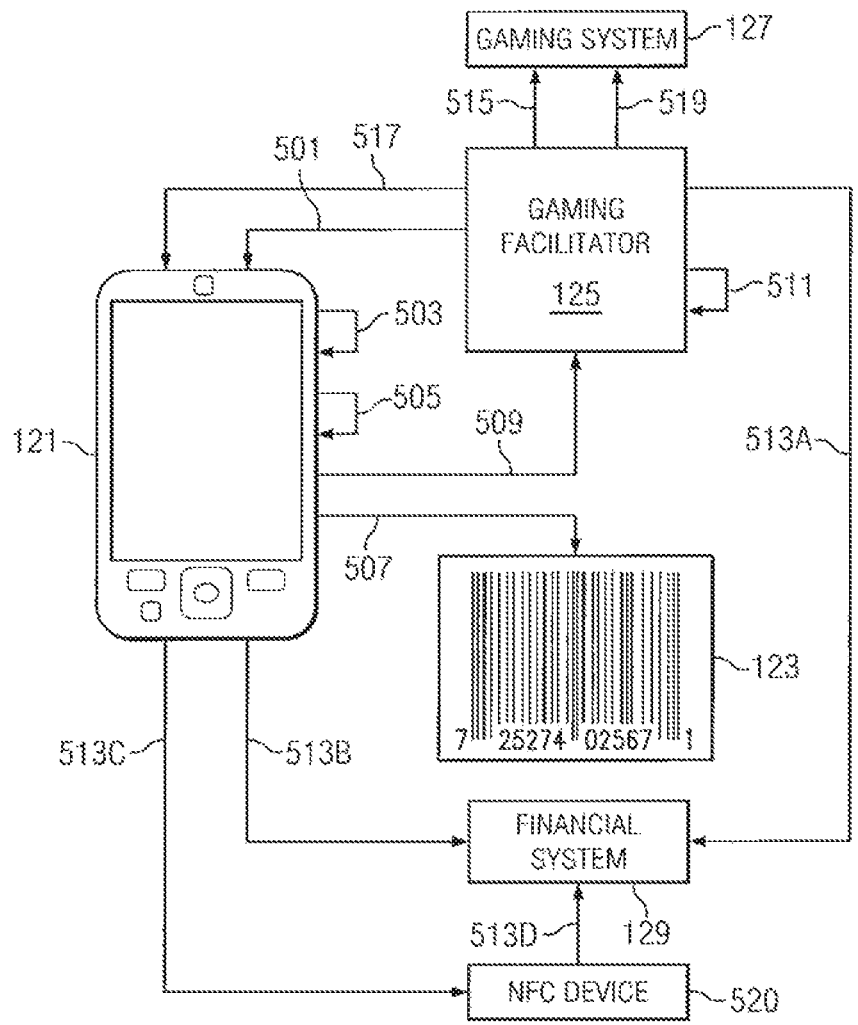

FIG. 5A is a schematic diagram illustrating a process for a game play. At action 501, the mobile device 121 downloads the mobile application from the gaming facilitator 125. At action 503, the user 101 uses the mobile application running on the mobile device 121 to select game play and ticketing options. The user 101 may make the game play and ticketing option selections at anytime prior to entering an approved retail location. At action 505, the user 101 presses a checkout or ready to play button displayed on the mobile device 121. At action 507, the user scans the barcode 123 displayed at the retail location. At action 509, the mobile device 121 sends a request associated with the game play request including the barcode information to the gaming facilitator 125. The request may include an image of the barcode, a value representing information encoded by the barcode, or other information to verify that the user was in a location at which the barcode was displayed.

At action 511, the gaming facilitator 125 verifies the location of the mobile device 121 based on the barcode information provided in the game play request. As mentioned previously, the physical location of the user and the mobile device at the time of the payment transaction can have implications for the legality of the transaction, depending upon the laws of the jurisdiction in which the gaming authority is operating.

At action 513A, the gaming facilitator 125 processes payment authorization through a direct gateway with financial system 129. In other embodiments, payment may be processed directly between the mobile device 121 and the financial system 129 as shown in action 513B. In still other embodiments, payment may be processed by tapping the mobile device 121 to a Near Field Communications (NFC) Transaction Anchor Point (TAP) 520 as shown in action 513C. In this embodiment, the NFC TAP 520 initiates the payment instruction to the financial system 129, as shown in action 513D.

At action 515, the gaming facilitator 125 sends a ticketing request to the gaming system 127, for example the lottery authority in the jurisdiction, which verifies and completes the gaming transaction.

At action 517, the gaming facilitator 125 sends ticket information and confirmation to the mobile device 121.

At action 519, the gaming facilitator 125 sends gaming processing and balancing information including transaction logs to the gaming system 127.

FIG. 5B is a schematic diagram illustrating a process for a game play. At action 551, the mobile device 121 downloads the mobile application from the gaming facilitator 125. At action 553, the user 101 uses the mobile application running on the mobile device 121 to select game play and ticketing options. The user 101 may make the game play and ticketing option selections at anytime prior to entering an approved retail location. At action 555, the user 101 presses a checkout or ready to play button displayed on the mobile device 121. The mobile application generates a barcode that is displayed on the screen of the mobile device 121. At action 557, the user scans the barcode displayed on the screen of the mobile device 121 at a terminal 570 installed at the retail location. The barcode may encode some or all of the information associated with the game play request. The terminal 570 may be an ATM machine, a gas pump, a stand alone device, etc. At action 559A, the mobile device 121 sends a request associated with the game play request to the gaming facilitator 125. The request may include some or all of the information encoded in the barcode. At action 559B, the terminal 570 sends transaction information to the gaming facilitator 125 informing the gaming facilitator 125 of the transaction with the mobile device 121. The transaction information may include some or all of the information encoded by the barcode. The request may include an image of the barcode, a value representing information encoded by the barcode, or other information to verify that the user was in the location at which the barcode was read.

For example, the barcode may include an identifier number that is preassigned to the mobile device 121 or randomly generated. The mobile device 121 may send the gaming request including all the game play parameters and the identifier number to the gaming facilitator 125. In such an embodiment, the terminal 570 may only send the identifier decoded from the barcode to the gaming facilitator 125. In receipt of this information, the gaming facilitator 125 obtains the game play request information and the information needed to verify that the mobile device 121 was in the same location as the terminal 570. In other embodiments, the mobile application may encode all of the game play request information in the barcode read by the terminal 570. In such an embodiment, it is not necessary that the mobile device 121 sends any information to the gaming facilitator 125 and all of the information needed to obtain the game play request and verify that the mobile device 121 is in the same location as the terminal 570 can be provided to the gaming facilitator 125 by the terminal 570. It will be appreciated that the information transmitted to the gaming facilitator 125 by the mobile device 121 and the terminal 570 may be apportioned between these devices in any of a number of ways and the above discussion is exemplary in nature.

At action 561, the gaming facilitator 125 verifies the location of the mobile device 121 based on the barcode information provided by the terminal 570. As mentioned previously, the physical location of the user and the mobile device at the time of the payment transaction can have implications for the legality of the transaction, depending upon the laws of the jurisdiction in which the gaming authority is operating.

At action 563A, the gaming facilitator 125 processes payment authorization through a direct gateway with financial system 129. In other embodiments, payment may be processed directly between the mobile device 121 and the financial system 129 as shown in action 563B. In still other embodiments, payment may be processed by tapping the mobile device 121 to a Near Field Communications (NFC) Transaction Anchor Point (TAP) 572 as shown in action 563C. In this embodiment, the NFC TAP 572 initiates the payment instruction to the financial system 129, as shown in action 563D. In embodiments where the terminal 570 is capable of performing financial transactions, such as an ATM or a device equipped with a bill reader, the terminal 570 may register the transaction with the financial system 129 at action 563E and accept the payment from the user.

At action 565, the gaming facilitator 125 sends a ticketing request to the gaming system 127, for example the lottery authority in the jurisdiction, which verifies and completes the gaming transaction.

At action 567, the gaming facilitator 125 sends ticket information and confirmation to the mobile device 121.

At action 569, the gaming facilitator 125 sends gaming processing and balancing information including transaction logs to the gaming system 127.

The above-described playing processes allow for gaming purchases such as lottery games on mobile devices while providing the assurances and verification that the sale of the gamine products occurred within the borders of the government regulating the games.

In some embodiments, the gaming facilitator 125 provides a retailer signup program as part of the mobile application. Prior to the sale of gaming (e.g., lottery) tickets a retail location or merchant may be required to be included on a list of pre-approved locations or merchants. This list can be maintained by an authority appropriate to ensure that the geographic location of the retail location or merchant has been confirmed. This could be the gaming facilitator or the gaming authority.

Embodiments of the terminal 570 may include an existing ATM or NFC device at a retailer, a dedicated gaming/lottery device at the retailer, or a device placed in conjunction with a new or existing lottery terminal.

Application Logic

Lottery system logic may reside at a device associated with the lottery system, such as the terminal or the gaming facilitator, within the gaming application on the mobile device, or both at the device and the host.

FIG. 6A is a schematic diagram illustrating a host-based input system 610. With the host-based terminal 610, the mobile device 611 is a user input/display device. The application logic 614 that determines what happens with each input and provides decision-making for what to display to the user occurs on a remote host 612. The host 612 contains automated lottery system logic and may gather the user input by providing the appropriate screens to the mobile device 611 (for example, to a gaming application running on the mobile device 611) and forwarding the user input to the gaming facilitator 613 either through an intermediary communications exchange server (not shown) or to the gaming facilitator 613 directly.

FIG. 6B is a schematic diagram illustrating a terminal-based input system 620. Terminal-based input systems have automated lottery system application logic 624 on the mobile device 621, for example as part of the mobile application stored on the mobile device 621. Accordingly, the mobile device 621 has the ability to walk a user through the game process and may then send the information that the user has selected to a gaming facilitator 623 either through an intermediary communications exchange server (not shown) or to the gaming facilitator directly.

FIG. 6C is a schematic diagram illustrating a hybrid-based input system 630. Hybrid-based input systems have some application logic 634A stored at the mobile device 631, for example as part of the mobile application stored on the mobile device 631, to gather user input and display the game specific parameters, but also rely on some application logic 634B stored at a remote host 632 to control the automated lottery system flow. An example of this is a cell phone with an automated lottery system application where the application on the phone controls the layout of the screen, receives user input, and performs basic validation (e.g., prevents the user from inputting text into numeric fields). But the cell phone may communicate with a host 632 to determine the order of the screens to display. The remote host 632 may communicate with a gaming facilitator 633 either through an intermediary communications exchange server (not shown) or with the gaming facilitator directly.

Figure 7A:
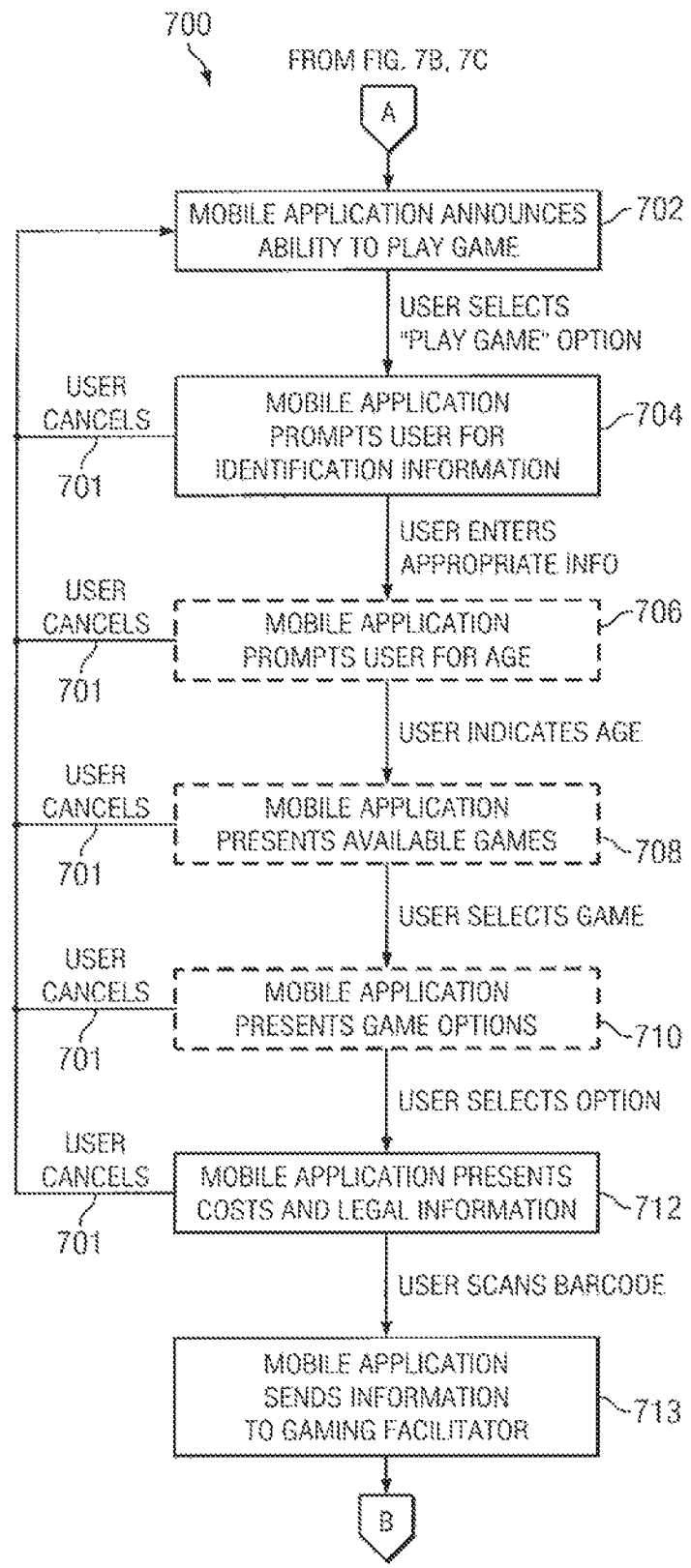
FIGS. 7A, 7B, and 7C are flow diagrams illustrating processes for a mobile application-based play of a lottery system presented game.
Figure 7B:
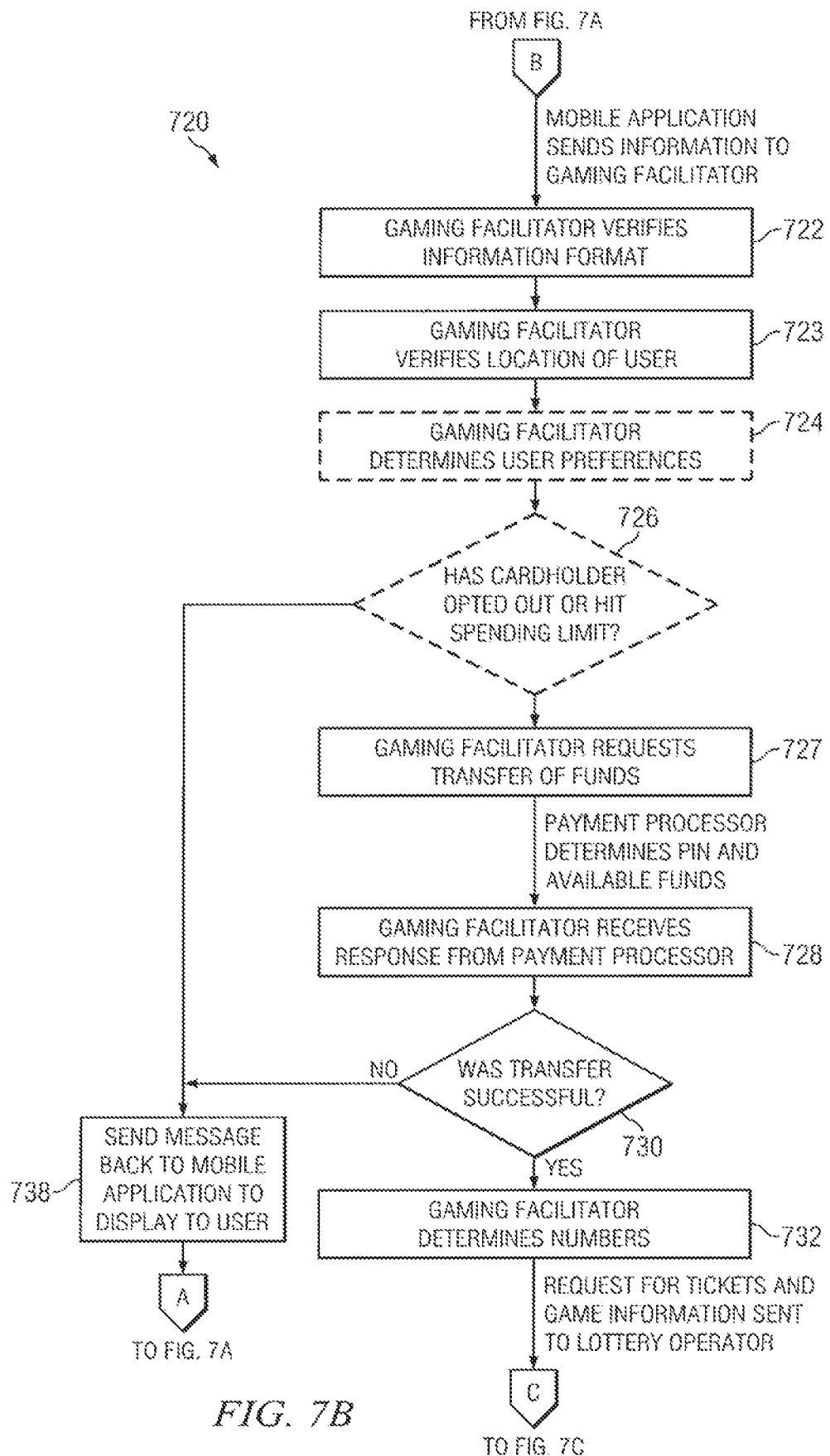
Figure 7C:
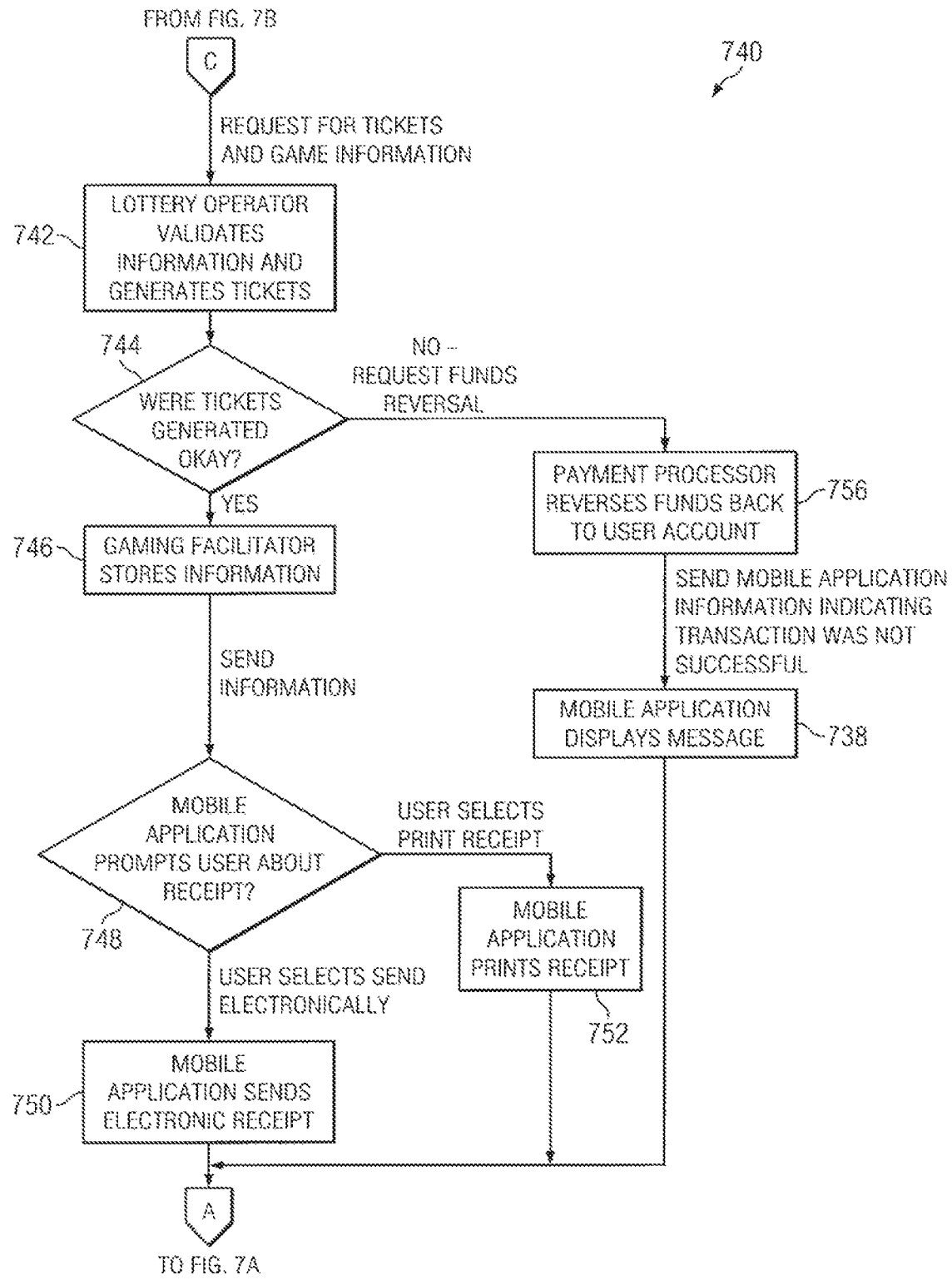

FIGS. 7A, 7B, and 7C are flow diagrams 700, 720, 740 illustrating a process for a mobile application-based play of an lottery system presented game. At action 702, a mobile application announces the ability for a user to play a game. In some embodiments, the mobile application may present a screen indicating that the mobile application is capable of providing game plays to the user. If a user decides to play a game, the mobile application requests that the user input identification information at action 704. For example, the mobile application may ask the user for their preferred language at action 704. For example, the mobile application may request that the user swipe a debit card and enter their debit card pin or provide information regarding an account with an eWallet platform at action 704.

The mobile application may optionally request that the user verify their age at action 706 if the user's age has not been verified by previous input at the mobile application. The mobile application may also optionally present a list of game options available through the mobile application at action 708. The list may include games that will become available at a future time and an indication that those games will be available in the future.

At action 710, the mobile application may present options for the selected game. For example, the mobile application may present the number of tickets available for purchase, game play times available, etc. at action 710. The terminal may also ask the user whether they would like to have their numbers sent to them or a link to their numbers sent to them. The mobile application presents the cost associated with the user's selections as well as any necessary legal disclosures at action 712. At any point in the process, the user may cancel the transaction at action 701.

The user scans a barcode at the retail location, and at action 713, the mobile application sends gaming information collected from the user to a gaming facilitator at action B. The barcode may be static displayed at the retail location on a sign or display or it may be dynamic generated by a terminal device such as an ATM or gas pump. The user may be required to make a selection following a prompt displayed on the terminal to request that the terminal display the barcode. In embodiments where the terminal generates a dynamic (for example random) barcode, the terminal may inform the gaming facilitator and/or gaming authority that the barcode has been generated along with an identifier to identify the barcode. The generated barcode may be valid only for a limited time. Static barcodes may also be valid only for a limited time.

As discussed above, in some embodiments, the mobile application displays the barcode, which is read by a terminal at the retail location at action 713. The terminal then informs the gaming facilitator of the read barcode.

The gaming facilitator may verify information format of the information sent by the terminal at action 722. For example, at action 722, the gaming facilitator may determine whether the information is sufficient and complete for a certain game play. The gaming facilitator may also ensure that the information is not corrupt. The gaming facilitator may also verify a user's age if their driver's license was presented at the terminal. If a driver's license is required by the game, but was not presented at the terminal, the gaming facilitator may cancel the transaction. If the transaction is canceled, the terminal may display a cancel message indicating the reason for the cancellation.

At action 723, the gaming facilitator verifies the location of the user. For example, the gaming facilitator may verify the location of the terminal that generated the barcode by referring to a pre-approval of the terminal with the gaming facilitator and/or the lottery authority. The gaming facilitator may also refer to a list of barcodes that are currently valid.

The gaming facilitator may also confirm the location of the retail location at which the barcode was read in embodiments where the mobile application generates the barcode.

At optional action 724, the gaming facilitator may look up the user to determine preferences for that user. These preferences can include a list of pre-stored or favorite numbers to be used in the game play. Other preferences can include whether the user desires automatic redemption of winning plays, or manual redemption through the delivery of a redemption code to the mobile device 121.

At optional action 726, the gaming facilitator may determine whether the user has opted out of the gaming system, whether the user has already hit their spending limit for a certain time period, etc. If either determination is affirmatively made at optional action 726, then the gaming facilitator sends a message back to the mobile application to display to the user at action 738 and the process may begin again with the same or a new user at action A. If the determination is not affirmatively made at optional action 726, then the process continues.

At action 727, the gaming facilitator may request a transfer of funds for the transaction. For example, the gaming facilitator may request that a payment processor verify the user PIN number, whether enough funds are available in the user account for the transaction, and to transfer the funds. The payment processor determines whether the pin is correct and whether funds are available and sends a response to the gaming facilitator. The gaming facilitator receives the response from the payment processor at action 728. The response may include, for example, verification from the payment processor whether the PIN is correct, whether funds are available, and/or whether the funds were transferred. If the gaming facilitator receives verification that the PIN is correct, that sufficient funds are available, and that the funds have been transferred at action 730, the gaming facilitator generates random numbers or uses user-specified numbers for the game play at action 732. If the gaming facilitator receives notification that the PIN is incorrect, that sufficient funds are not available, or that the funds were not transferred at action 730, the gaming facilitator sends a message back to the terminal to display to the user at action 738 and the process may begin again with the same or a new user at action A. A request for the desired number of tickets and games along with game information is sent by the gaming facilitator to the lottery operator at action C.

The lottery operator validates information received from the gaming facilitator and generates tickets if the information is validated at action 742. The gaming facilitator determines whether the tickets were generated correctly at action 744. If the tickets were not generated correctly, the gaming facilitator requests a funds reversal to the payment processor, and the payment processor may reverse the funds back to the user account at action 756. The gaming facilitator sends a message back to the mobile application to display to the user at action 738 and the process may begin again with the same or a new user at action A. If the tickets were generated correctly, the gaming facilitator will store game play information at action 746. The gaming facilitator sends to the terminal game play numbers, transaction numbers, and a confirmation of the transaction. The mobile application may prompt the user to indicate whether to receive a receipt electronically or obtain a barcode for use in redeeming winnings at action 748. If the mobile device is equipped with a printer or configured to access a printer, the mobile application may prompt the user to indicate whether to receive a printed receipt. If the user selects to print the receipt, the terminal prints the receipt at action 752 and the process may begin again with the same or a new user at action A. If the user selects to receive the receipt electronically, the terminal gathers user information and sends the electronic receipt at action 750. The process may begin again with the same or a new user at action A.

Host-based mobile applications are mobile applications that receive instructions from a host instead of having internal local logic. Accordingly, a process for a host-based play of a lottery system presented game is slightly different than the mobile application-based play. A host-based terminal is connected to a host from the beginning of a transaction or at each step requiring new information between user actions, whereas a mobile application-based terminal might connect to the host or to a gaming facilitator after certain decisions and actions are taken by a user during a transaction. Being connected earlier allows the host-based mobile application to query a gaming facilitator database for information about the user at an earlier time in the transaction. This is also the case for mobile application-based play flow where the mobile application has a substantially constant connection such as with a network connection like Wi-Fi or CDMA/GSM.

Figure 8A:
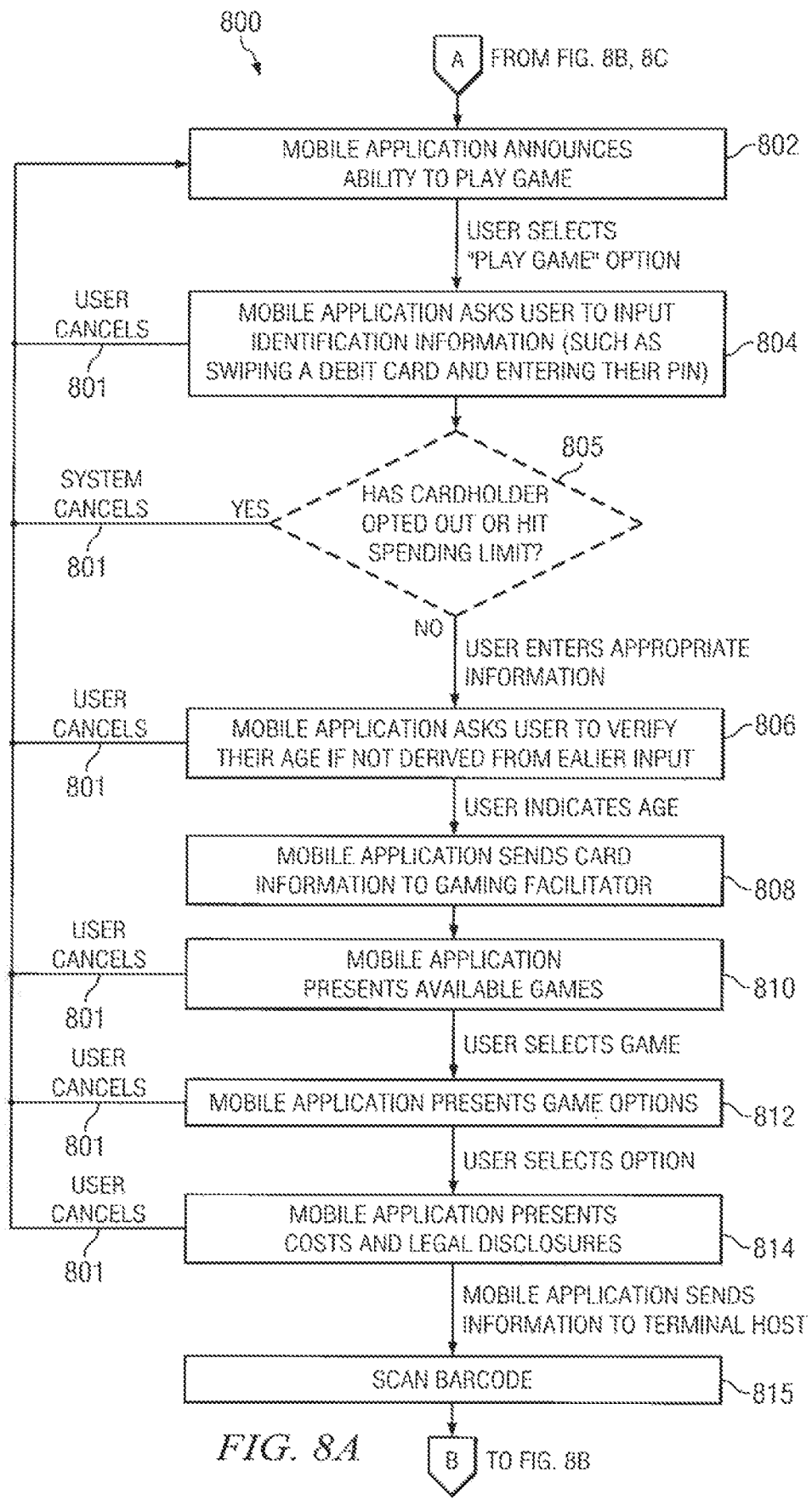
FIGS. 8A, 8B, and 8C are flow diagrams illustrating processes for a host-based play and mobile application-based play where the mobile application has a substantially constant connection of an automated lottery system presented game.
Figure 8B:
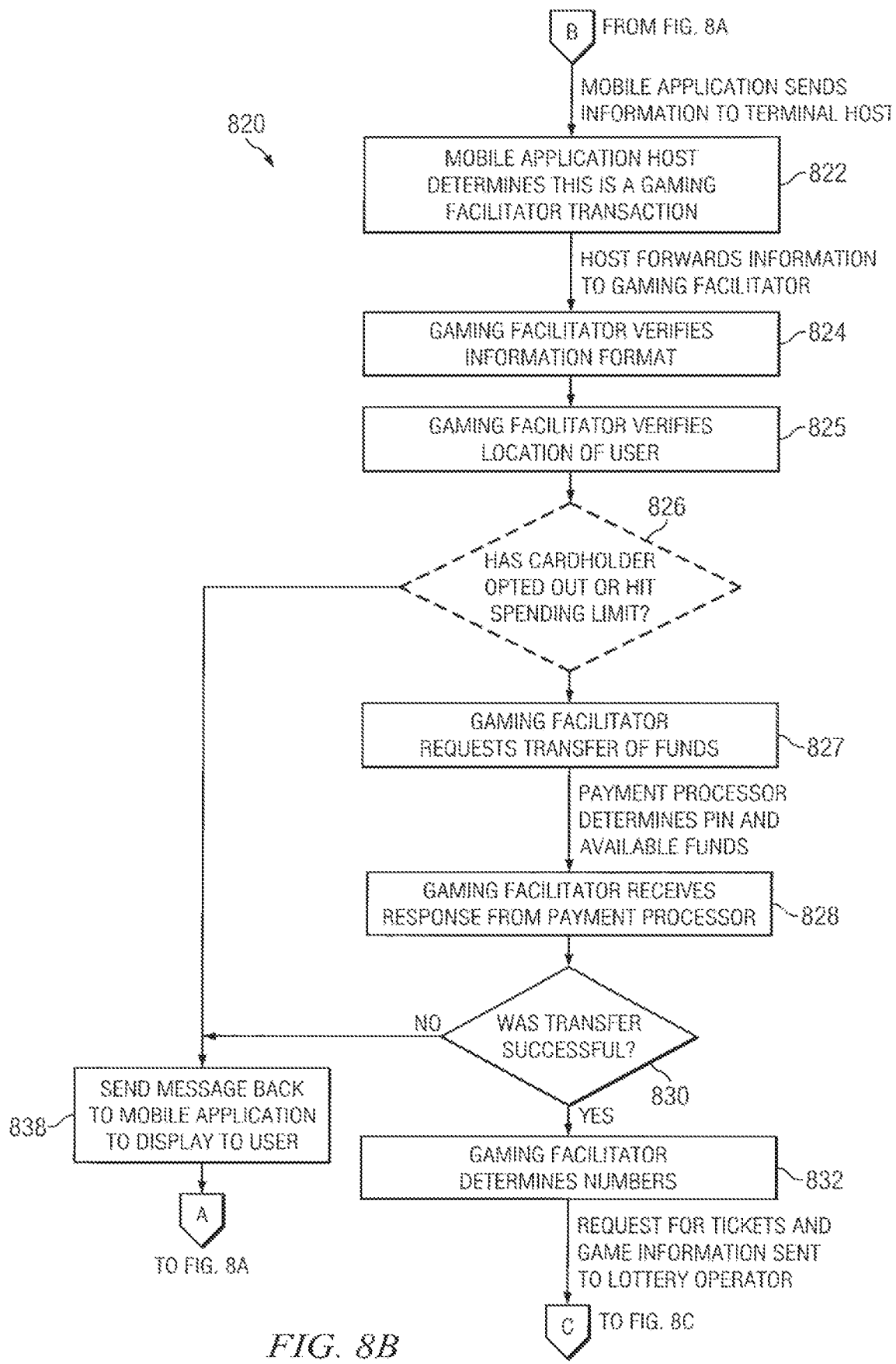
Figure 8C:
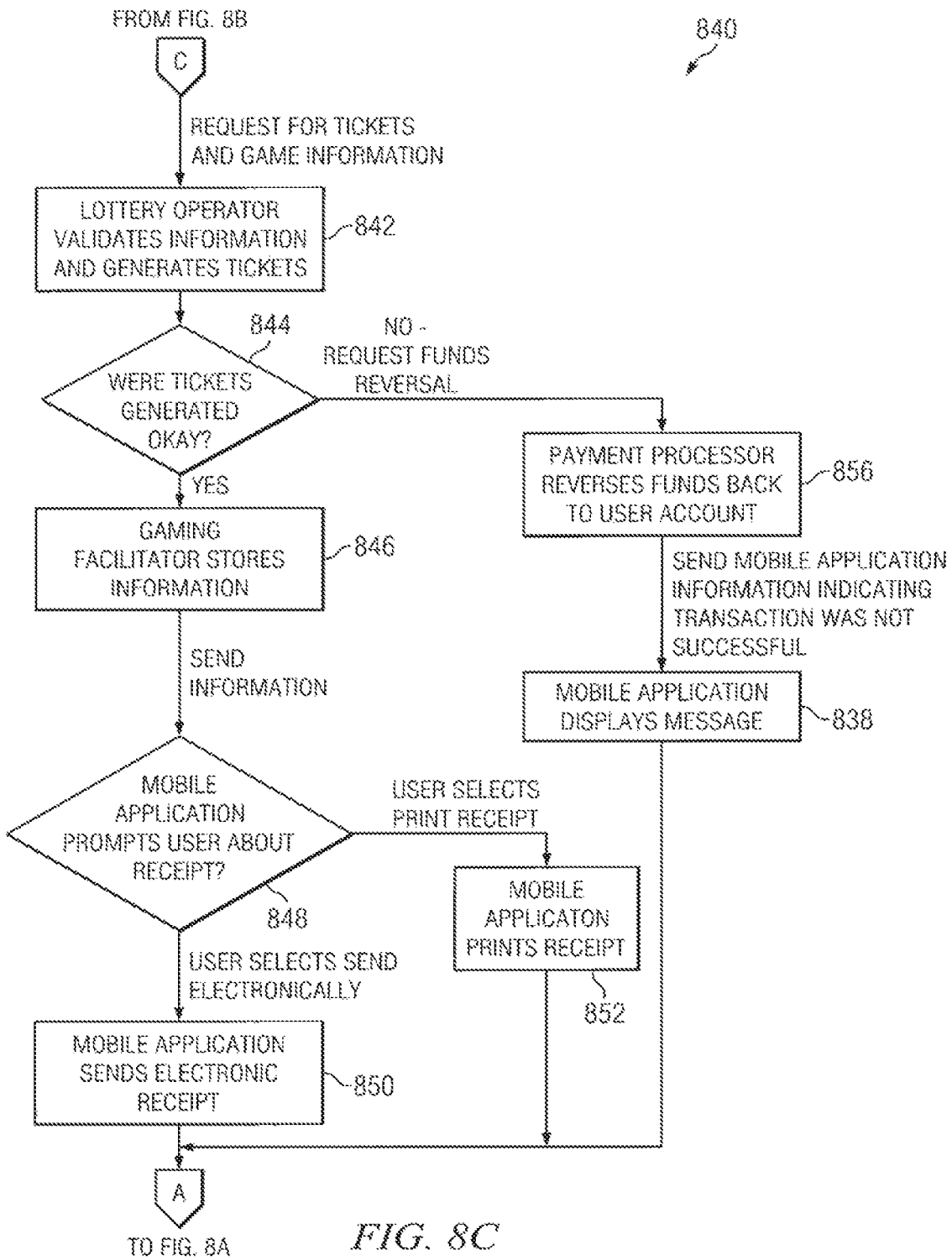

FIGS. 8A, 8B, and 8C are flow diagrams 800, 820, 840 illustrating a process for a host-based play (and mobile application-based play where the mobile application has a substantially constant connection) of an automated lottery system presented game. At action 802, a mobile application announces the ability for a user to play a game. For example, the mobile application may present a screen indicating that the mobile application is capable of providing game plays to the user. If a user decides to play a game, the mobile application requests that the user input identification information at action 804. In some embodiments, the mobile application may ask the user for their preferred language at action 804. In some embodiments, the mobile application may request that the user swipe a debit card and enter their debit card pin or provide information regarding an account with an eWallet platform at action 804.

In an embodiment, at optional action 805, the gaming facilitator may determine whether the user has opted out of the automated gaming system, whether the user has already hit their spending limit for a certain time period, etc. If either determination is affirmatively made at optional action 805, then the gaming facilitator system cancels the transaction at action 801. The system may send a message back to the mobile application to display to the user and the process may begin again with the same or a new user at action A. If the determination is not affirmatively made at optional action 805, then the process continues at action 806.

The mobile application also requests that the user verify their age at action 806 if the user's age has not been verified by previous input at the terminal. The mobile application sends card information to a gaming facilitator (via a mobile device) at action 808 to determine whether the user is a registered user. The mobile application may present a list of game options available at the user's location at action 810. The list may include games that will become available at a future time and an indication that those games will be available in the future. At action 812, the mobile application may present options for the selected game. For example, the mobile application may present the number of tickets available for purchase, game play times available, etc. at action 812. The mobile application may also ask the user whether they would like to have their numbers sent to them or a link to their numbers sent to them. The mobile application presents the cost associated with the user's selections as well as any necessary legal disclosures at action 814. At any point in the process, the user may cancel the transaction at action 801.

The user scans a barcode at the retail location, and at action 815, the mobile application sends gaming information collected from the user to a terminal host at action B. The barcode may be static displayed at the retail location on a sign or display or it may be dynamic generated by a terminal device such as an ATM or gas pump. The user may be required to make a selection following a prompt displayed on the terminal to request that the terminal display the barcode. In embodiments where the terminal generates a dynamic (for example random) barcode, the terminal may inform the gaming facilitator and/or gaming authority that the barcode has been generated along with an identifier to identify the barcode. The generated barcode may be valid only for a limited time. Static barcodes may also be valid only for a limited time.

As discussed above, in some embodiments, the mobile application displays the barcode, which is read by a terminal at the retail location at action 815. The terminal then informs the gaming facilitator of the read barcode.

At action 822, a terminal host determines based on the information sent from the mobile application that the transaction is a gaming facilitator transaction. The host may forward the information to the gaming facilitator. The gaming facilitator may verify information format of the information sent by the mobile application at action 824. For example, at action 824, the gaming facilitator may determine whether the information is sufficient and complete for a certain game play. The gaming facilitator may also ensure that the information is not corrupt. The gaming facilitator may also verify a user's age if their driver's license was presented at the terminal. If a driver's license is required by the game, but was not presented at the terminal, the gaming facilitator may cancel the transaction. If the transaction is canceled, the terminal may display a cancel message indicating the reason for the cancellation.

At action 825, the gaming facilitator verifies the location of the user. For example, the gaming facilitator may verify the location of the terminal that generated the barcode by referring to a pre-approval of the terminal with the gaming facilitator and/or the lottery authority. The gaming facilitator may also refer to a list of barcodes that are currently valid.

The gaming facilitator may also confirm the location of the retail location at which the barcode was read in embodiments where the mobile application generates the barcode.

In an embodiment, at optional action 826, the gaming facilitator may look up the user to determine preferences for that user. At action 826, the gaming facilitator may determine whether the user has opted out of the gaming system, whether the user has already hit their spending limit for a certain time period, etc. If either determination is affirmatively made at action 826, then the gaming facilitator sends a message back to the mobile application (e.g., via the mobile device) host to display to the user at action 838 and the process may begin again with the same or a new user at action A. If the determination is not affirmatively made at action 826, then the process continues.

At action 827, the gaming facilitator may request a transfer of funds for the transaction. For example, the gaming facilitator may request that a payment processor verify the user PIN number, whether enough funds are available in the user account for the transaction, and to transfer the funds. The payment processor determines whether the pin is correct and whether funds are available and sends a response to the gaming facilitator. The gaming facilitator receives the response from the payment processor act action 828. The response may include, for example, verification from the payment processor whether the PIN is correct, whether funds are available, and/or whether the funds were transferred.

The gaming facilitator receives verification from the payment processor whether the PIN is correct, whether funds are available, and/or whether the funds were transferred at action 828. If the gaming facilitator receives verification that the PIN is correct, that sufficient funds are available, and that the funds have been transferred at action 830, the gaming facilitator generates random numbers or uses user-specified numbers for the game play at action 832. If the gaming facilitator receives notification that the PIN is incorrect, that sufficient funds are not available, or that the funds were not transferred at action 830, the gaming facilitator sends a message back to the terminal (e.g., via the terminal host) to display to the user at action 838 and the process may begin again with the same or a new user at action A. A request for the desired number of tickets and games along with game information is sent by the gaming facilitator to the lottery operator at action C.

The lottery operator validates information received from the gaming facilitator and generates tickets if the information is validated at action 842. The gaming facilitator determines whether the tickets were generated correctly at action 844. If the tickets were not generated correctly, the gaming facilitator requests a funds reversal to the payment processor, and the payment processor may reverse the funds back to the user account at action 856. The gaming facilitator sends a message back to the terminal to display to the user at action 838 and the process may begin again with the same or a new user at action A. If the tickets were generated correctly, the gaming facilitator will store game play information at action 846. The gaming facilitator sends to the terminal (e.g., via the terminal host) game play numbers, transaction numbers, and a confirmation of the transaction. The terminal may prompt the user to indicate whether to print a receipt at the terminal or receive a receipt electronically at action 848. If the user selects to print the receipt, the terminal prints the receipt at action 852 and the process may begin again with the same or a new user at action A. If the user selects to receive the receipt electronically, the terminal gathers user information and sends the electronic receipt at action 850. The process may begin again with the same or a new user at action A.

Figure 9:
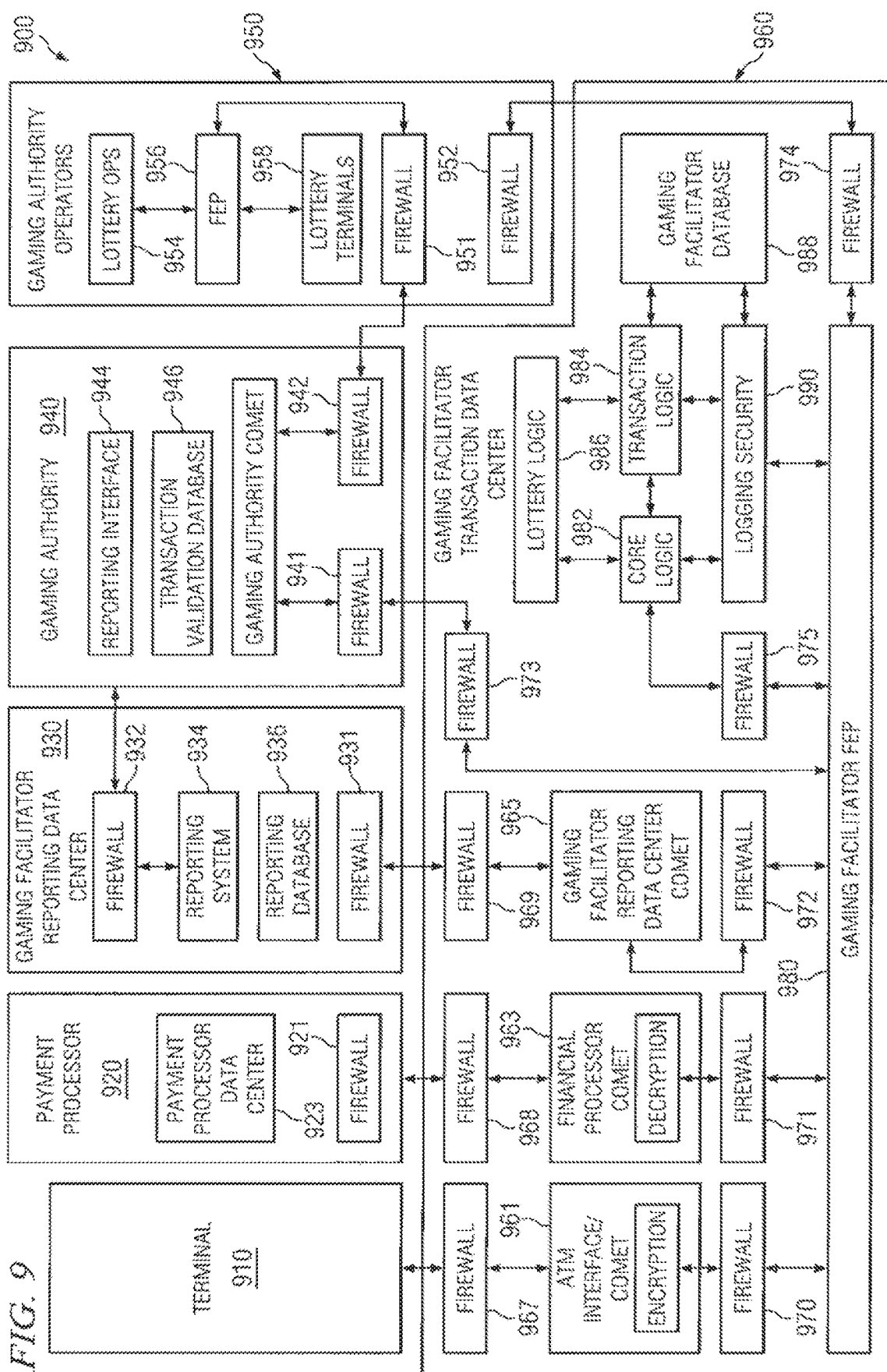
FIG. 9 is a schematic diagram illustrating a gaming facilitator system.

FIG. 9 is a schematic diagram illustrating a gaming facilitator system 900. System 900 may include a terminal 910, a payment processor 920, a gaming facilitator reporting data center 930, a gaming authority 940, gaming authority operators 950 and gaming facilitator transaction data center 960.

The gaming facilitator transaction data center 960 is in communication with the terminal 910, the payment processor 920, the gaming facilitator reporting data center 930 and the gaming authority 940. Using alternative connectivity, the gaming facilitator transaction data center 960 may be in communication with the gaming authority operators 950. In some embodiments, the communication with the gaming facilitator transaction data center 950 may be made via communications exchange servers 961, 963 and 965. Firewalls 921, 931, 941, 942, 951, 952 and 967-974 provide isolation between various systems and components in the system 900.

The payment processor 920 may include payment processor data center 923. The payment processor 920 connects with the gaming facilitator transaction data center 960 via a secure connection (e.g., MPLS or other "private" connection) between the firewall 921 at the payment processor 920 and the firewall 968 at the gaming facilitator transaction data center 960.

The gaming facilitator reporting data center 930 may include reporting system 934 and reporting database 936. The gaming facilitator reporting data center 930 connects with the gaming facilitator transaction data center 960 via a secure connection (e.g., MPLS or other "private" connection) between the firewall 931 at the gaming facilitator reporting data center 930 and the firewall 969 at the gaming facilitator transaction data center 960.

The gaming authority 940 may include a reporting interface 944 and a transaction validation database 946. The gaming authority 940 connects with the gaming facilitator transaction data center 960 via a secure connection (e.g., MPLS or other "private" connection) between the firewall 941 at the gaming authority 940 and the firewall 973 at the gaming facilitator transaction data center 960. Also, the gaming authority 940 connects with the firewall 932 of the gaming facilitator reporting data center 930 via a secure connection (e.g., MPLS or other "private" connection.

The gaming authority operators 950 may include a lottery ops (operations) 954, an FEP 956 and lottery terminals 958. The lottery ops 954 is in communication with the FEP 956, which is in communication with the lottery terminals 958. The gaming authority operators 950 connects with the gaming authority 950 via a secure Ethernet connection (e.g., B to B API) between the firewall 942 at the gaming authority 940 and the firewall 951 at the gaming authority operators 950. Alternate connectivity may be provided between the firewall 974 of the gaming facilitator transaction data center 960 and the firewall 952 of the gaming authority operators 950.

The gaming facilitator transaction data center 960 may include a gaming facilitator FEP 980, core logic 982, transaction logic 984, lottery logic 986, a gaming facilitator database 988 and logging security 990. The core logic 982, the transaction logic 984 and the lottery logic 986 are in communication with one another. The core logic 982 is in communication with the gaming facilitator FEP 980 through firewall 975. The gaming facilitator database 988 is in communication with the transaction logic 984. The logging security 990 is in communication with the gaming facilitator 980, the core logic 982, the transaction logic 984 and the gaming facilitator database 988.

It will be appreciated that the above discussion of a ticket, a gaming ticket, a lottery ticket, etc is not limited to a particular type of ticket or transaction and the embodiments described above are applicable to all types of electronically facilitated transactions including, among other things, e-ticketing, the sale of e-tickets, etc.

In some embodiments, a method is provided for processing game-playing transactions. The method comprises: receiving or sending information associated with a game-playing transaction between a user device and a game-playing apparatus, wherein the game-playing transaction is associated with a game; determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location matches the second location information or identification information, or determining a period of validity associated with the information has not expired, wherein the game-playing transaction is conducted on a first communication interface, and wherein the information associated with the game-playing transaction is received or sent on the first communication interface or a second communication interface.

In some embodiments, the identification information comprises merchant information.

In some embodiments, the information associated with the game-playing transaction comprises at least one of game-playing request information, pre game-playing transaction information, post game-playing transaction information, in-game information, game information, user information, location information, user device identification information, game-related information, or game-playing apparatus identification information.

In some embodiments, the game-playing transaction comprises at least one of a gaming transaction, a game purchase transaction, a pre-game transaction, a post-game transaction, an in-game transaction, a game-related transaction, a location determining transaction, a user device identifying transaction, or a game-playing apparatus identifying transaction.

In some embodiments, the location comprises or is determined based on global positioning system (GPS) coordinates of the user device or the game-playing apparatus, or location information or identification information of the game-playing apparatus or the user device.

In some embodiments, the user device comprises a mobile computing device.

In some embodiments, the user device comprises a mobile phone.

In some embodiments, the user device comprises a mobile device, and wherein the game-playing apparatus comprises a remote computing apparatus.

In some embodiments, the information associated with the game-playing transaction is received or sent on the first communication interface.

In some embodiments, the user device comprises a mobile device, and wherein the game-playing apparatus comprises a remote computing apparatus.

In some embodiments, the user device comprises a fuel pump, and wherein the game-playing apparatus comprises a remote server.

In some embodiments, the user device comprises a mobile device, and wherein the game-playing apparatus comprises a local computing apparatus.

In some embodiments, the information associated with the game-playing transaction is received or sent on the first communication interface.

In some embodiments, the information associated with the game-playing transaction is received or sent on the second communication interface.

In some embodiments, the second communication interface is located between the user device and game-playing apparatus.

In some embodiments, the second communication interface is located between the game-playing apparatus and a remote computing apparatus.

In some embodiments, the first communication interface is located between the user device and the game-playing apparatus.

In some embodiments, the second communication interface is located between the user device and the game-playing apparatus.

In some embodiments, the game-playing apparatus comprises a gaming facilitator.

In some embodiments, the game-playing facilitator comprises a firewall, logging security, core logic, and transaction logic.

In some embodiments, the game-playing apparatus comprises a communications exchange server.

In some embodiments, the game comprises a lottery game.

In some embodiments, the game comprises a non-lottery game.

In some embodiments, the game-playing transaction was conducted between the user device and the game-playing apparatus.

In some embodiments, the user device is integrated with a fuel pump.

In some embodiments, the processing the game-playing transaction or enabling initiation or conduction of the game-playing transaction is based on determining the user device or the game-playing apparatus is located in the approved location associated with the game based on cross-referencing second location information or identification information, and determining the location matches the second location information or identification information.

In some embodiments, the processing the game-playing transaction or enabling initiation or conduction of the game-playing transaction is based on determining a period of validity associated with the information has not expired.

In some embodiments, the location information comprises a parameter, and the second location information comprises a second parameter.

In some embodiments, the receiving or sending information is executed before the game-playing transaction between the user device and the game-playing apparatus.

In some embodiments, the receiving or sending information is executed after the game-playing transaction between the user device and the game-playing apparatus.

In some embodiments, the receiving or sending information is executed substantially simultaneously with the game-playing transaction between the user device and the game-playing apparatus.

In some embodiments, the determining the user device or the game-playing apparatus is located in the approved location associated with the game comprises cross-referencing the second location information or identification information, and determining the location matches the second location information or identification information.

In some embodiments, the first communication interface comprises at least one of a Bluetooth interface, a near-field communication (NFC) interface, a code-based interface, a Wi-Fi interface, or a cellular interface.

In some embodiments, the first communication interface and the second communication interface are the same communication interface.

In some embodiments, the location is determined based on global positioning system (GPS) coordinates of the device.

In some embodiments, the user device comprises a non-electronic user device or wherein the game-playing apparatus comprises a non-electronic game-playing apparatus.

In some embodiments, the user device or the game-playing apparatus comprises at least one of a pump, an ATM, a servicing station, a retail station, a local computing apparatus, or a remote computing apparatus.

In some embodiments, the user device or the game-playing apparatus comprises a local computing apparatus and a remote computing apparatus.

In some embodiments, the user device comprises a local computing apparatus and a remote computing apparatus.

In some embodiments, the game-playing apparatus comprises a local computing apparatus and a remote computing apparatus.

In some embodiments, the receiving or sending information comprises receiving or sending information between a second user device and the game-playing apparatus.

In some embodiments, the local computing apparatus comprises a retail station.

In some embodiments, a method is provided for processing game-playing transactions. The method comprises: receiving or sending information associated with a game-playing transaction conducted or to be conducted between a user device and a game-playing apparatus, wherein the game-playing transaction is associated with a game, wherein the game is associated with or comprises second information, determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, a method is provided for processing game-playing transactions. The method comprises: receiving or sending information associated with a game-playing transaction conducted or to be conducted between a user device and a game-playing apparatus, wherein the game-playing transaction is associated with a game, wherein the game is associated with or comprises second information; determining a location of the user device or the game-playing apparatus associated with the game-playing transaction; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, the location is consistent with the second location information or identification information when the location matches the second location information or identification information.

In some embodiments, a method is provided for processing game-playing transactions. The method comprises: receiving or sending information associated with a game-playing transaction between a user device and a game-playing apparatus, wherein the game-playing transaction is associated with a game, wherein the game is associated with or comprises second information, determining a location of the user device or the game-playing apparatus associated with the game-playing transaction; determining the user device or the game-playing apparatus is located in an approved location associated with the game; modifying or configuring the user device or the game-playing apparatus based on the user device or the game-playing apparatus being located in the approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining information associated with the location meets third information (e.g., parameter information), or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, modifying or configuring the user device or the game-playing apparatus comprises modifying or configuring a user interface of the user device or the game-playing apparatus.

In some embodiments, modifying or configuring the user device or the game-playing apparatus comprises modifying or configuring a hardware element of the user device or the game-playing apparatus.

In some embodiments, modifying or configuring the user device or the game-playing apparatus comprises modifying or configuring a software element of the user device or the game-playing apparatus.

In some embodiments, a method for processing game-playing transactions is provided. The method comprises: receiving or sending information associated with a game-playing transaction between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; modifying or configuring the user device or the game-playing apparatus based on the user device or the game-playing apparatus being located in the approved location associated with the game, and based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, an apparatus is provided for processing game-playing transactions. The apparatus comprises a computing device processor configured for: receiving or sending information associated with a game-playing transaction conducted or to be conducted between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, the user device or the game-playing apparatus comprises at least one of a pump, an ATM, a servicing station, a retail station, a local computing apparatus, a remote computing apparatus, or the apparatus.

In some embodiments, the apparatus comprises at least one of a pump, an ATM, a servicing station, a retail station, a local computing apparatus, a remote computing apparatus, a user device, or the game-playing apparatus.

In some embodiments, the apparatus comprises or is comprised in a gaming facilitator.

In some embodiments, the apparatus comprises or is comprised in a customized gaming facilitator.

In some embodiments, the apparatus comprises or is comprised in a communications exchange server.

In some embodiments, an apparatus is provided for processing game-playing transactions. The apparatus comprises a computing device processor configured for: receiving or sending information associated with a game-playing transaction between a user device and a game-playing apparatus, wherein the game-playing transaction is associated with a game, wherein the game is associated with or comprises second information; determining a location of the user device or the game-playing apparatus associated with the game-playing transaction; determining the user device or the game-playing apparatus is located in an approved location associated with the game; modifying or configuring the user device or the game-playing apparatus based on the user device or the game-playing apparatus being located in the approved location associated with the game, and based on at least one of: determining the user device or the game-playing apparatus is located in the approved location associated with the game based on cross-referencing second location information or identification information, and determining the location is consistent with the second location information or identification information, or determining a period of validity associated with the information or the second information has not expired, wherein the game-playing transaction is conducted or is to be conducted on a first communication interface, and wherein the information associated with the game-playing transaction is received or sent on the first communication interface or a second communication interface.

In some embodiments, a fuel pump is provided for processing game-playing transactions. The fuel pump comprises a computing device processor associated configured for: receiving or sending information associated with a game-playing transaction between a user device and a game-playing apparatus, wherein the game-playing transaction is associated with a game; determining a location of the user device or the game-playing apparatus associated with the game-playing transaction; determining the user device or the game-playing apparatus is located in an approved location associated with the game; processing a game-playing transaction or enabling initiation or conduction of the game-playing transaction based on at least one of: determining the user device or the game-playing apparatus is located in the approved location associated with the game based on cross-referencing second location information or identification information, and determining the location is consistent with the second location information or identification information, or determining a period of validity associated with the information has not expired, wherein the game-playing transaction is conducted or is to be conducted on a first communication interface, and wherein the information associated with the game-playing transaction is received or sent on the first communication interface or a second communication interface.

In some embodiments, a method is provided for processing, or enabling initiation or conduction of, game-playing transactions, the method comprising: receiving information associated with a game-playing transaction between a user device and a game-playing apparatus configured for operations associated with game-playing transactions, wherein the game-playing transaction is associated with a game, wherein the game is associated with or comprises game information, wherein the game-playing transaction or the information comprises or is based on a game-play created on a mobile device in communication with a game-playing interface device, wherein the game-playing interface device is in communication with the user device; determining, using one or more computing device processors, location information or identification information associated with the user device or the game-playing apparatus associated with the game-playing transaction, the user device or the game-playing apparatus being located in an approved location associated with the game, the location information or the identification information comprising approved location information or approved identification information, respectively; processing the information or the game-playing transaction, or enabling initiation or conduction of the game-playing transaction, based on at least one of: cross-referencing, using the one or more computing device processors, second information or second identification information, and determining, using the one or more computing device processors, the location information or the identification information is at least partially consistent with or mappable to the second information or the second identification information, or determining, using the one or more computing device processors, a period of validity associated with the information or the game information has not expired, wherein the game-playing transaction is conducted or is to be conducted on a first communication interface, and wherein the information associated with the game-playing transaction is received on the first communication interface or a second communication interface.

In some embodiments, the user device is located in the approved location associated with the game, and wherein the location information or the identification information comprises the location information.

In some embodiments, the identification information comprises merchant information.

In some embodiments, the location information comprises or is determined based on: global positioning system (GPS) coordinates of the user device or the game-playing apparatus, or the identification information associated with the user device or the game-playing apparatus.

In some embodiments, the method further comprises initiating, by at least one of the user device or the game-playing apparatus, printing of an instrument associated with the game at a printer.

In some embodiments, the information associated with the game-playing transaction comprises at least one of game-playing request information, pre game-playing transaction information, post game-playing transaction information, in-game information, the game information, user information, the location information, second location information, the identification information, game-related information, game-playing apparatus information, or game-playing apparatus identification information, or wherein the game-playing transaction comprises at least one of a gaming transaction, a game initiation transaction, a game completing transaction, a pre-game transaction, a post-game transaction, an in-game transaction, a game-related transaction, an identification transaction, an information processing transaction, a location determining transaction, a user identification transaction, a user device identifying transaction, a game-play creation transaction, a game-play scanning or communication transaction, a game-playing apparatus-related transaction, a game-playing interface device-related transaction, or a game-playing apparatus identifying transaction.

In some embodiments, the second information comprises second location information.

In some embodiments, the user device comprises a local computing device configured for second operations associated with the game-playing transactions, and wherein the game-playing apparatus comprises a remote computing apparatus configured for the operations associated with the game-playing transactions.

In some embodiments, the user device comprises a retail terminal configured for second operations associated with the game-playing transactions.

In some embodiments, the mobile device comprises a mobile telecommunication device configured for second operations associated with the game-playing transactions or a mobile computing device configured for the second operations associated with the game-playing transactions.

In some embodiments, the game-playing interface device comprises a scanner configured for scanning the game-play created on the mobile device, and communicating the game-play to at least one of the user device or the game-playing apparatus.

In some embodiments, the game-play is comprised in a code presented on a display of the mobile device.

In some embodiments, the game-playing interface device is comprised in or integrated into the mobile device.

In some embodiments, the game-playing interface device is comprised in or integrated into the user device.

In some embodiments, the game-play is stored on the mobile device.

In some embodiments, the game-play is stored on a remote computing apparatus.

In some embodiments, the information associated with the game-playing transaction is received or sent on the first communication interface.

In some embodiments, the user device comprises a fuel pump, and wherein the game-playing apparatus comprises a remote computing apparatus.

In some embodiments, the method further comprises modifying the user device or the game-playing apparatus based on determining, using the one or more computing device processors, the period of validity associated with the information or the game information has not expired.

In some embodiments, the information associated with the game-playing transaction is received or sent on the second communication interface.

In some embodiments, the second communication interface is located between the user device and the game-playing apparatus.

In some embodiments, the second communication interface is located between the game-playing apparatus and a remote computing apparatus.

In some embodiments, the first communication interface is located between the user device and the game-playing apparatus.

In some embodiments, the second communication interface is located at least one of between the user device and the game-playing apparatus, or between the game-playing apparatus and a remote computing apparatus.

In some embodiments, the game-playing apparatus comprises a specialized gaming facilitator, wherein the specialized gaming facilitator comprises a firewall, logging security, core logic, and customized transaction logic.

In some embodiments, the game-playing apparatus comprises a specialized communications exchange server.

In some embodiments, the game comprises a lottery game.

In some embodiments, the game comprises a non-lottery game.

In some embodiments, the game information comprises expiration information.

In some embodiments, the determining, using the one or more computing device processors, the location information or the identification information is at least partially consistent with or mappable to the second information or the second identification information comprises determining, using the one or more computing device processors, the location information or the identification information matches the second information or the second identification information.

In some embodiments, the method further comprises modifying the user device or the game-playing apparatus based on determining, using the one or more computing device processors, the location information or the identification information is at least partially consistent with or mappable to the second information or the second identification information.

In some embodiments, the processing the information or the game-playing transaction, or enabling the initiation or the conduction of the game-playing transaction, is based on validating, using the one or more computing device processors, an age of a user associated with the user device, the game-playing apparatus, the mobile device, or the game-playing interface device.

In some embodiments, the game information is comprised in the information.

In some embodiments, the information is comprised in the game information.

In some embodiments, the game-playing transaction comprises a gaming operation.

In some embodiments, the game-playing transaction comprises a specialized game-related operation.

In some embodiments, the cross-referencing, using the one or more computing device processors, the second information or the second identification information, and determining, using the one or more computing device processors, the location information or the identification information is at least partially consistent with or mappable to the second information or the second identification information, or determining, using the one or more computing device processors, the period of validity associated with the information or the game information has not expired, comprises cross-referencing, using the one or more computing device processors, the second information or the second identification information, and determining, using the one or more computing device processors, the location information or the identification information is at least partially consistent with or mappable to the second information or the second identification information.

In some embodiments, the cross-referencing, using the one or more computing device processors, the second information or the second identification information, and determining, using the one or more computing device processors, the location information or the identification information is at least partially consistent with or mappable to the second information or the second identification information, or determining, using the one or more computing device processors, the period of validity associated with the information or the game information has not expired, comprises determining, using the one or more computing device processors, the period of validity associated with the information or the game information has not expired.

In some embodiments, the receiving the information is executed before the game-playing transaction is conducted between the user device and the game-playing apparatus.

In some embodiments, the receiving the information is executed after the game-playing transaction is conducted between the user device and the game-playing apparatus.

In some embodiments, the receiving the information is part of the game-playing transaction or executed substantially simultaneously with the game-playing transaction between the user device and the game-playing apparatus.

In some embodiments, the first communication interface or the second communication interface comprises at least one of a Bluetooth interface, a near-field communication (NFC) interface, a code-based interface, a Wi-Fi interface, a cellular interface, or a wired interface.

In some embodiments, the game-play is communicated from the mobile device to the game-play interface device on at least one of a Bluetooth interface, a near-field communication (NFC) interface, a code-based interface, a Wi-Fi interface, a cellular interface, or a wired interface.

In some embodiments, the first communication interface and the second communication interface are the same communication interface.

In some embodiments, the user device comprises a non-electronic user device or wherein the game-playing apparatus comprises a non-electronic game-playing apparatus.

In some embodiments, the user device or the game-playing apparatus comprises or is integrated with or comprised in at least one of a pump, an ATM, a servicing station, a retail apparatus, an entity, a local computing apparatus, or a remote computing apparatus.

In some embodiments, the user device comprises a local computing apparatus and a remote computing apparatus.

In some embodiments, the game-playing apparatus comprises a local computing apparatus and a remote computing apparatus.

In some embodiments, the receiving the information further comprises at least one of receiving or sending the information between a second user device and the game-playing apparatus, or between the user device and a second game-playing apparatus.

In some embodiments, a location of the user device or the game-playing apparatus comprises or is based on the identification information or the location information associated with the user device or the game-playing apparatus.

In some embodiments, a location of the user device or the game-playing apparatus is determined based on input received at at least one of the user device or the game-playing apparatus.

In some embodiments, the second communication interface is associated with longer range communication compared to the first communication interface.

In some embodiments, the one or more computing device processors are comprised in at least one of the user device, the game-playing apparatus, the game-playing interface device, one or more local computing apparatuses, or one or more remote computing apparatuses.

In some embodiments, the one or more computing device processors are software-customized for performing specialized operations associated with the game-playing transactions.

In some embodiments, an apparatus is provided for processing, or enabling initiation or conduction of, game-playing transactions, the apparatus comprising one or more gaming-configured integrated circuits configured for: receiving information associated with a game-playing transaction between a user device and a game-playing apparatus configured for operations associated with game-playing transactions, wherein the game-playing transaction is associated with a game, wherein the game is associated with or comprises game information; determining location information or identification information associated with the user device or the game-playing apparatus associated with the game-playing transaction, the user device or the game-playing apparatus being located in an approved location associated with the game, the location information or the identification information comprising approved location information or approved identification information, respectively; processing the information or the game-playing transaction, or enabling initiation or conduction of the game-playing transaction, based on at least one of: cross-referencing second information or second identification information, and determining the location information or the identification information is at least partially consistent with or mappable to the second information or the second identification information, or determining a period of validity associated with the information or the game information has not expired, wherein the game-playing transaction is conducted or will be conducted on a first communication interface, and wherein the information associated with the game-playing transaction is received on the first communication interface or a second communication interface.

In some embodiments, the game-playing transaction or the information is based on a game-play presented on a mobile device, wherein the mobile device communicates the game-play to a game-playing interface device, and wherein the game-playing interface device communicates the game-play to at least one of the user device or the game-playing apparatus.

In some embodiments, the game-playing interface device comprises a scanner configured for scanning the game-play presented on the mobile device, and communicating the game-play to the at least one of the user device or the game-playing apparatus, wherein the game-play is comprised in a code presented on a display of the mobile device.

In some embodiments, the user device, the game-playing interface device, or the game-playing apparatus comprises or is integrated with or comprised in at least one of a pump, an ATM, a servicing station, a retail apparatus, an entity, a local computing apparatus, a remote computing apparatus, or the apparatus.

In some embodiments, the game comprises a lottery game.

In some embodiments, the game comprises a non-lottery game.

In some embodiments, the one or more gaming-configured integrated circuits are specially configured for or customized for processing the information or the game-playing transaction, or enabling the initiation or the conduction of the game-playing transaction.

In some embodiments, an apparatus is provided for processing, or enabling initiation or conduction of, game-playing transactions, the apparatus comprising one or more software-customized processors configured for: receiving information associated with a game-playing transaction between a user device and a game-playing apparatus configured for operations associated with game-playing transactions, wherein the game-playing transaction is associated with a game, wherein the game is associated with or comprises game information; determining location information or identification information associated with the user device or the game-playing apparatus associated with the game-playing transaction; determining the user device or the game-playing apparatus is associated with approved location information or approved identification information, the user device or the game-playing apparatus being located in an approved location associated with the game; processing the information or the game-playing transaction, or enabling initiation or conduction of the game-playing transaction, based on at least one of: cross-referencing second information or second identification information, and determining the location information or the identification information is at least partially consistent with or mappable to the second information or the second identification information, or determining a period of validity associated with the information or the game information has not expired, wherein the game-playing transaction is conducted or is to be conducted on a first communication interface, and wherein the information associated with the game-playing transaction is received on the first communication interface or a second communication interface.

In some embodiments, the information is received from a game-playing interface device, wherein the game-playing interface device receives the information from a mobile device, wherein the information is associated with a game-play presented on the mobile device.

In some embodiments, the game-playing interface device comprises a scanner configured for scanning the game-play presented on the mobile device, and communicating the game-play to at least one of the user device or the game-playing apparatus, wherein the game-play presented on the mobile device comprises a code presented on a display of the mobile device.

In some embodiments, the user device, the game-playing apparatus, or the game-playing interface device, comprises or is integrated with or comprised in at least one of a pump, an ATM, a servicing station, a retail apparatus, an entity, a local computing apparatus, a remote computing apparatus, or the apparatus.

In some embodiments, the game comprises a lottery game.

In some embodiments, the game comprises a non-lottery game.

In some embodiments, the one or more software-customized processors are specially configured for processing the information or the game-playing transaction, or enabling the initiation or the conduction of the game-playing transaction.

In some embodiments, an apparatus is provided for processing, or enabling initiation or conduction of, game-playing transactions, the apparatus comprising one or more computing device processors configured for: receiving information associated with a game-playing transaction between a user device and a game-playing apparatus configured for operations associated with game-playing transactions, wherein the game-playing transaction is associated with a game, wherein the game is associated with or comprises game information; determining location information or identification information associated with the user device or the game-playing apparatus associated with the game-playing transaction, the user device or the game-playing apparatus being located in an approved location associated with the game; modifying or configuring the user device or the game-playing apparatus based on the user device or the game-playing apparatus being associated with approved location information or approved identification; processing the information or the game-playing transaction, or enabling initiation or conduction of the game-playing transaction, based on at least one of: cross-referencing second information or second identification information, and determining the location information or the identification information is at least partially consistent with or mappable to the second information or the second identification information, or determining a period of validity associated with the information or the game information has not expired, wherein the game-playing transaction is conducted or is to be conducted on a first communication interface, and wherein the information associated with the game-playing transaction is received on the first communication interface or a second communication interface.

In some embodiments, the information is communicated to the user device via a game-playing interface device.

In some embodiments, the apparatus is integrated with or is comprised in at least one of a pump, an ATM, a servicing station, a retail apparatus, a local computing apparatus, a remote computing apparatus, the user device, the game-playing interface device, or the game-playing apparatus.

In some embodiments, the game-playing interface device comprises a scanner configured for scanning the information from a code presented on a mobile device.

In some embodiments, the user device, the game-playing interface device, the mobile device, or the game-playing apparatus comprises or is integrated with or comprised in at least one of a pump, an ATM, a servicing station, a retail apparatus, an entity, a local computing apparatus, a remote computing apparatus, or the apparatus.

In some embodiments, the modifying or configuring the user device or the game-playing apparatus comprises modifying or configuring a user interface of the user device or the game-playing apparatus, at least one of the user device or the game-playing apparatus being configured for the operations or second operations associated with the game-playing transactions.

In some embodiments, the modifying or configuring the user device or the game-playing apparatus comprises modifying or configuring a software component of the user device or the game-playing apparatus, at least one of the user device or the game-playing apparatus being configured for the operations or second operations associated with the game-playing transactions.

In some embodiments, the modifying or configuring the user device or the game-playing apparatus comprises modifying or configuring a hardware component of the user device or the game-playing apparatus, at least one of the user device or the game-playing apparatus being configured for the operations or second operations associated with the game-playing transactions.

In some embodiments, the apparatus comprises or is comprised in a software-customized gaming facilitator.

In some embodiments, the apparatus comprises or is comprised in a software-customized communications exchange server.

In some embodiments, the game comprises a lottery game.

In some embodiments, the game comprises a non-lottery game.

In some embodiments, the cross-referencing the second information or the second identification information, and determining the location information or the identification information is at least partially consistent with or mappable to the second information or the second identification information, or determining the period of validity associated with the information or the game information has not expired, comprises cross-referencing the second information or the second identification information, and determining the location information or the identification information is at least partially consistent with or mappable to the second information or the second identification information.

In some embodiments, the cross-referencing the second information or the second identification information, and determining the location information or the identification information is at least partially consistent with or mappable to the second information or the second identification information, or determining the period of validity associated with the information or the game information has not expired, comprises determining the period of validity associated with the information or the game information has not expired.

In some embodiments, a method associated with game-playing transactions is provided, the method comprising: receiving, at a game-playing interface device, first information associated with a game-playing transaction between a user device and a game-playing apparatus configured for operations associated with game-playing transactions, wherein the game-playing transaction is associated with a game, wherein the game is associated with or comprises game information, wherein the first information is compared to second information associated with the game-playing transaction to determine post-game-playing transaction information, wherein at least one of the user device, the game-playing apparatus, or the game-playing interface device is configured for: determining, using one or more computing device processors, location information or identification information associated with the user device or the game-playing apparatus associated with the game-playing transaction, the user device or the game-playing apparatus being located in an approved location associated with the game, the location information or the identification information comprising approved location information or approved identification information, respectively; processing the first information or the game-playing transaction, or enabling initiation or conduction of the game-playing transaction, based on at least one of: cross-referencing, using the one or more computing device processors, the second information or second identification information, and determining, using the one or more computing device processors, the location information or the identification information is at least partially consistent with or mappable to the second information or the second identification information, or determining, using the one or more computing device processors, a period of validity associated with the first information or the game information has not expired, wherein the game-playing transaction is conducted or is to be conducted on a first communication interface, and wherein the information associated with the game-playing transaction is received on the first communication interface or a second communication interface.

In some embodiments, the user device comprises a local computing device or a mobile computing device configured for second operations associated with the game-playing transactions, and wherein the game-playing apparatus comprises a remote computing apparatus configured for the operations associated with the game-playing transactions.

In some embodiments, the game-playing interface device comprises at least one of a mobile device or a scanner configured for conducting or processing second operations associated with the game-playing transactions.

In some embodiments, the information associated with the game-playing transaction comprises at least one of game-playing request information, pre game-playing transaction information, the post game-playing transaction information, in-game information, the game information, user information, the location information, the identification information, game-related information, game-playing apparatus information, or game-playing apparatus identification information, or wherein the game-playing transaction comprises at least one of a gaming transaction, a game initiation transaction, a game completing transaction, a pre-game transaction, a post-game transaction, an in-game transaction, a game-related transaction, an identification transaction, an information processing transaction, a location determining transaction, a user identification transaction, a user device identifying transaction, a game-play creation transaction, a game-play scanning or communication transaction, a game-playing apparatus-related transaction, a game-playing interface device-related transaction, or a game-playing apparatus identifying transaction.

In some embodiments, the game-playing interface device is comprised in or integrated into the user device.

In some embodiments, the user device, the game-playing interface device, or the game-playing apparatus comprises or is integrated with or comprised in at least one of a pump, an ATM, a servicing station, a retail apparatus, an entity, a local computing apparatus, or a remote computing apparatus.

In some embodiments, the first information comprises ticket information.

In some embodiments, the second information comprises winning ticket information.

In some embodiments, the post-game-playing transaction information is transmitted to the game-playing interface device, and wherein the post-game-playing transaction information informs a user of the game-playing interface device or the user device about an outcome associated with the game-playing transaction.

In some embodiments, the game-playing apparatus comprises or is comprised in a software-customized communications exchange server.

In some embodiments, the one or more computing device processors are comprised in at least one of the user device, the game-playing apparatus, the game-playing interface device, one or more local computing apparatuses, or one or more remote computing apparatuses.

In some embodiments, the one or more computing device processors are customized for performing specialized operations associated with the game-playing transactions.

In some embodiments, the game comprises a lottery game.

In some embodiments, the game comprises a non-lottery game.

In some embodiments, a method is provided for processing, or enabling initiation or conduction of, game-playing transactions, the method comprising: enabling generation or initiation of a game comprising an interface for playing the game on a user device; integrating gaming compliance operations into the game, wherein the gaming compliance operations comprise: receiving or sending information, associated with a game-playing transaction, between a user device and a game-playing apparatus, wherein the game-playing transaction is associated with a game, wherein the game is associated with or comprises game information; determining, using one or more computing device processors, location information or identification information associated with the user device or the game-playing apparatus, determining, using the one or more computing device processors, the user device or the game-playing apparatus comprises or is an approved user device or an approved game-playing apparatus, wherein the approved user device or the approved game-playing apparatus is located in an approved location associated with the game; processing the information or the game-playing transaction, or enabling initiation or conduction of the game-playing transaction, based on at least one of: determining, using the one or more computing device processors, the user device or the game-playing apparatus comprises or is the approved user device or the approved game-playing apparatus based on determining, using the one or more computing device processors, the location information or the identification information is at least partially consistent with or mappable to second information or second identification information, or determining, using the one or more computing device processors, a period of validity associated with the information or the game information has not expired, wherein the game-playing transaction is conducted or is to be conducted on a first communication interface, and wherein the information associated with the game-playing transaction is received or sent on the first communication interface or a second communication interface.

In some embodiments, the game-playing transaction comprises, is, or is comprised in at least one of a gaming transaction, a wagering transaction, a game initiation transaction, a game completing transaction, a lottery transaction, a pre-game transaction, a post-game transaction, an in-game transaction, a game-related transaction, a card-based transaction, a betting transaction, a location determining transaction, an identification transaction, an information processing transaction, a user identification transaction, a user device identifying transaction, a mobile device identifying transaction, a game-playing apparatus-related transaction, or a game-playing apparatus identifying transaction.

In some embodiments, at least one of: determining, using the one or more computing device processors, the user device or the game-playing apparatus comprises or is the approved user device or the approved game-playing apparatus based on determining, using the one or more computing device processors, the location information or the identification information is at least partially consistent with the second information or the second identification information, or determining, using the one or more computing device processors, the period of validity associated with the information or the game information has not expired, comprises: determining, using the one or more computing device processors, the user device or the game-playing apparatus comprises or is the approved user device or the approved game-playing apparatus based on determining, using the one or more computing device processors, the identification information is at least partially consistent with the second information or the second identification information.

In some embodiments, at least one of: determining, using the one or more computing device processors, the user device or the game-playing apparatus comprises or is the approved user device or the approved game-playing apparatus based on determining, using the one or more computing device processors, the location information or the identification information is at least partially consistent with the second information or the second identification information, or determining, using the one or more computing device processors, the period of validity associated with the information or the game information has not expired, comprises: determining, using the one or more computing device processors, the period of validity associated with the information or the game information has not expired.

In some embodiments, the one or more computing device processors are comprised in at least one of the user device, the game-playing apparatus, or one or more local or remote computing apparatuses.

In some embodiments, the one or more computing device processors are software-customized for performing specialized operations associated with the game-playing transactions.

In some embodiments, the user device or the game-playing apparatus comprises, is, or is associated with, integrated with, or comprised in at least one of a pump, an ATM, a servicing station, a retail apparatus, an entity, one or more mobile computing devices, one or more non-mobile computing devices, one or more local computing apparatuses, or one or more remote computing apparatuses.

In some embodiments, the user device comprises an apparatus configured for receiving, processing, or transmitting the information associated with the game-playing transaction.

In some embodiments, the first communication interface is located between the user device and game-playing apparatus.

In some embodiments, the second communication interface is located at least one of between the user device and the game-playing apparatus, or between the game-playing apparatus and a second game-playing apparatus.

In some embodiments, the first communication interface and the second communication interface are the same communication interface.

In some embodiments, the first communication interface and the second communication interface are different communication interfaces.

In some embodiments, the first communication interface or the second communication interface comprises at least one of a Bluetooth-based interface, a near-field communication (NFC) interface, a code-based interface, a Wi-Fi interface, a cellular interface, or a wired interface.

In some embodiments, the game-playing apparatus comprises a customized gaming facilitator, wherein the customized gaming facilitator comprises a firewall, logging security, core logic, and customized transaction logic.

In some embodiments, the game-playing apparatus comprises one or more communication exchange servers.

In some embodiments, the information comprises the identification information associated with the user device or the game-playing apparatus.

In some embodiments, the identification information associated with the user device or the game-playing apparatus comprises entity identification information for an entity associated with the user device or the game-playing apparatus.

In some embodiments, receiving or sending the information is executed before the game-playing transaction.

In some embodiments, receiving or sending the information is executed after the game-playing transaction.

In some embodiments, receiving or sending the information is executed as part of or substantially simultaneously with the game-playing transaction.

In some embodiments, the game-playing apparatus comprises one or more game-playing apparatuses, and wherein the one or more computing device processors are comprised in the one or more game-playing apparatuses.

In some embodiments, a method is provided for processing, or enabling initiation or conduction of, game-playing transactions, the method comprising: initiating a gaming application on a user device, the initiation of the gaming application triggering the user device to contact a gaming compliance appliance or function at a remote server, wherein the remote server performs: enabling generation or initiation of a game comprising an interface for playing the game on a user device; integrating gaming compliance operations into the game, wherein the gaming compliance operations comprise: receiving or sending information, associated with a game-playing transaction, between a user device and a game-playing apparatus, wherein the game-playing transaction is associated with a game, wherein the game is associated with or comprises game information; determining, using one or more computing device processors, location information or identification information associated with the user device or the game-playing apparatus; determining, using the one or more computing device processors, the user device or the game-playing apparatus comprises or is an approved user device or an approved game-playing apparatus, wherein the approved user device or the approved game-playing apparatus is located in an approved location associated with the game; processing the information or the game-playing transaction, or enabling initiation or conduction of the game-playing transaction, based on at least one of: determining, using the one or more computing device processors, the user device or the game-playing apparatus comprises or is the approved user device or the approved game-playing apparatus based on determining, using the one or more computing device processors, the location information or the identification information is at least partially consistent with or mappable to second information or second identification information, or determining, using the one or more computing device processors, a period of validity associated with the information or the game information has not expired, wherein the game-playing transaction is conducted or is to be conducted on a first communication interface, and wherein the information associated with the game-playing transaction is received or sent on the first communication interface or a second communication interface.

In some embodiments, an apparatus is provided for processing, or enabling initiation or conduction of, game-playing transactions, the apparatus comprising one or more computing device processors configured to: receive or send information, associated with a game-playing transaction, between a user device and a game-playing apparatus, wherein the game-playing transaction is associated with a game, wherein the game is associated with or comprises game information; determine location information or identification information associated with the user device or the game-playing apparatus; determine the user device or the game-playing apparatus is associated with approved location information or approved identification information associated with the game, wherein the user device or the game-playing apparatus is located in an approved location associated with the game; process the information or the game-playing transaction, or enable initiation or conduction of the game-playing transaction, based on at least one of: determining the user device or the game-playing apparatus is associated with the approved location information or the approved identification information associated with the game based on determining the location information or the identification information is at least partially consistent with or mappable to second information or second identification information, or determining a period of validity associated with the information or the game information has not expired, wherein the game-playing transaction is conducted or is to be conducted on a first communication interface, and wherein the information associated with the game-playing transaction is received or sent on the first communication interface or a second communication interface.

In some embodiments, at least one of: determining the user device or the game-playing apparatus is associated with the approved location information or the approved identification information associated with the game based on determining the location information or the identification information is at least partially consistent with or mappable to the second information or the second identification information, or determining the period of validity associated with the information or the game information has not expired, comprises: determining the user device or the game-playing apparatus is associated with the approved location information or the approved identification information associated with the game based on determining the location information or the identification information is at least partially consistent with or mappable to the second information or the second identification information.

In some embodiments, at least one of: determining the user device or the game-playing apparatus is associated with the approved location information or the approved identification information associated with the game based on determining the location information or the identification information is at least partially consistent with or mappable to the second information or the second identification information, or determining the period of validity associated with the information or the game information has not expired, comprises: determining the period of validity associated with the information or the game information has not expired.

In some embodiments, the apparatus is further configured to modify or configure the user device or the game-playing apparatus based on the determination that the user device or the game-playing apparatus is associated with the approved location information or the approved identification information associated with the game.

In some embodiments, the one or more computing device processors are software-customized for processing the information, or enabling the initiation or the conduction of, the game-playing transaction.

In some embodiments, at least one of the user device or the game-playing apparatus comprises, is, or is associated with, integrated with, or comprised in at least one of a pump, an ATM, a servicing station, a retail apparatus, an entity, one or more mobile computing devices, one or more non-mobile computing devices, one or more local computing apparatuses, one or more remote computing apparatuses, or the apparatus.

In some embodiments, at least one of the first communication interface or the second communication interface is located between the apparatus, or the game-playing apparatus, and the user device, and wherein the at least one of the first communication interface or the second communication interface comprises one or more intermediary computing devices enabling communication between the apparatus, or the game-playing apparatus, and the user device.

In some embodiments, a method is provided for processing, or enabling initiation or conduction of, game-playing transactions, the method comprising: enabling generation or initiation of a game comprising an interface for playing the game on a user device; integrating gaming compliance operations into the game, wherein the gaming compliance operations comprise: receiving or sending information, associated with a game-playing transaction, between a user device and a game-playing apparatus, wherein the game-playing transaction is associated with a game, wherein the game is associated with or comprises game information; determining, using one or more computing device processors, location information or identification information associated with the user device or the game-playing apparatus; determining, using the one or more computing device processors, the user device or the game-playing apparatus comprises or is an approved user device or an approved game-playing apparatus, wherein the approved user device or the approved game-playing apparatus is located in an approved location associated with the game; processing the information or the game-playing transaction, or enabling initiation or conduction of the game-playing transaction, based on at least one of: determining, using the one or more computing device processors, the user device or the game-playing apparatus comprises or is the approved user device or the approved game-playing apparatus based on determining, using the one or more computing device processors, the location information or the identification information is at least partially consistent with or mappable to second information or second identification information, or determining, using the one or more computing device processors, a period of validity associated with the information or the game information has not expired, wherein the game-playing transaction is conducted or is to be conducted on a first communication interface, and wherein the information associated with the game-playing transaction is received or sent on the first communication interface or a second communication interface. In some embodiments, the method further comprises determining whether the game is allowed in the jurisdiction.

In some embodiments, the game-playing transaction comprises, is, or is comprised in at least one of a gaming transaction, a wagering transaction, a game initiation transaction, a game completing transaction, a lottery transaction, a pre-game transaction, a post-game transaction, an in-game transaction, a game-related transaction, a card-based transaction, a betting transaction, a location determining transaction, an identification transaction, an information processing transaction, a user identification transaction, a user device identifying transaction, a mobile device identifying transaction, a game-playing apparatus-related transaction, or a game-playing apparatus identifying transaction.

In some embodiments, at least one of: determining, using the one or more computing device processors, the user device or the game-playing apparatus comprises or is the approved user device or the approved game-playing apparatus based on determining, using the one or more computing device processors, the location information or the identification information is at least partially consistent with the second information or the second identification information, or determining, using the one or more computing device processors, the period of validity associated with the information or the game information has not expired, comprises: determining, using the one or more computing device processors, the user device or the game-playing apparatus comprises or is the approved user device or the approved game-playing apparatus based on determining, using the one or more computing device processors, the identification information is at least partially consistent with the second information or the second identification information.

In some embodiments, at least one of: determining, using the one or more computing device processors, the user device or the game-playing apparatus comprises or is the approved user device or the approved game-playing apparatus based on determining, using the one or more computing device processors, the location information or the identification information is at least partially consistent with the second information or the second identification information, or determining, using the one or more computing device processors, the period of validity associated with the information or the game information has not expired, comprises: determining, using the one or more computing device processors, the period of validity associated with the information or the game information has not expired.

In some embodiments, the one or more computing device processors are comprised in at least one of the user device, the game-playing apparatus, or one or more local or remote computing apparatuses.

In some embodiments, the one or more computing device processors are software-customized for performing specialized operations associated with the game-playing transactions.

In some embodiments, the user device or the game-playing apparatus comprises, is, or is associated with, integrated with, or comprised in at least one of a pump, an ATM, a servicing station, a retail apparatus, an entity, one or more mobile computing devices, one or more non-mobile computing devices, one or more local computing apparatuses, or one or more remote computing apparatuses.

In some embodiments, the user device comprises an apparatus configured for receiving, processing, or transmitting the information associated with the game-playing transaction.

In some embodiments, the first communication interface is located between the user device and game-playing apparatus.

In some embodiments, the second communication interface is located at least one of between the user device and the game-playing apparatus, or between the game-playing apparatus and a second game-playing apparatus.

In some embodiments, the first communication interface and the second communication interface are the same communication interface.

In some embodiments, the first communication interface and the second communication interface are different communication interfaces.

In some embodiments, the first communication interface or the second communication interface comprises at least one of a Bluetooth-based interface, a near-field communication (NFC) interface, a code-based interface, a Wi-Fi interface, a cellular interface, or a wired interface.

In some embodiments, the game-playing apparatus comprises a customized gaming facilitator, wherein the customized gaming facilitator comprises a firewall, logging security, core logic, and customized transaction logic.

In some embodiments, the game-playing apparatus comprises one or more communication exchange servers.

In some embodiments, the information comprises the identification information associated with the user device or the game-playing apparatus.

In some embodiments, the identification information associated with the user device or the game-playing apparatus comprises entity identification information for an entity associated with the user device or the game-playing apparatus.

In some embodiments, receiving or sending the information is executed before the game-playing transaction.

In some embodiments, receiving or sending the information is executed after the game-playing transaction.

In some embodiments, receiving or sending the information is executed as part of or substantially simultaneously with the game-playing transaction.

In some embodiments, the game-playing apparatus comprises one or more game-playing apparatuses, and wherein the one or more computing device processors are comprised in the one or more game-playing apparatuses.

In some embodiments, a method is provided for processing, or enabling initiation or conduction of, game-playing transactions, the method comprising: initiating a gaming application on a user device, the initiation of the gaming application triggering the user device gaming protection appliance to contact a gaming compliance appliance at a remote server, wherein the remote server performs: enabling generation or initiation of a game comprising an interface for playing the game on a user device; integrating gaming compliance operations into the game, wherein the gaming compliance operations comprise: receiving or sending information, associated with a game-playing transaction, between a user device and a game-playing apparatus, wherein the game-playing transaction is associated with a game, wherein the game is associated with or comprises game information; determining, using one or more computing device processors, location information or identification information associated with the user device or the game-playing apparatus; determining, using the one or more computing device processors, the user device or the game-playing apparatus comprises or is an approved user device or an approved game-playing apparatus, wherein the approved user device or the approved game-playing apparatus is located in an approved location associated with the game; processing the information or the game-playing transaction, or enabling initiation or conduction of the game-playing transaction, based on at least one of: determining, using the one or more computing device processors, the user device or the game-playing apparatus comprises or is the approved user device or the approved game-playing apparatus based on determining, using the one or more computing device processors, the location information or the identification information is at least partially consistent with or mappable to second information or second identification information, or determining, using the one or more computing device processors, a period of validity associated with the information or the game information has not expired, wherein the game-playing transaction is conducted or is to be conducted on a first communication interface, and wherein the information associated with the game-playing transaction is received or sent on the first communication interface or a second communication interface. In some embodiments, the user device receives the result in encrypted fashion and then decrypts the encrypts result.

In some embodiments, a method is provided for receiving or sending information, associated with a game-playing transaction, between a user device and a game-playing apparatus, wherein the game-playing transaction is associated with a game application, wherein the game application is associated with or comprises game information; determining, using one or more computing device processors, physical location information associated with the user device or the game-playing apparatus; transmitting the physical location information to a remote computing apparatus, wherein the remote computing apparatus determines the user device or the game-playing apparatus comprises or is an approved user device or an approved game-playing apparatus and transmits location-related information to the user device, wherein the approved user device or the approved game-playing apparatus is located in an approved physical location associated with the game, and wherein the computing apparatus determines the user device or the game-playing apparatus comprises or is the approved user device or the approved game-playing apparatus based on at least one of: determining, using the one or more computing device processors, the user device or the game-playing apparatus comprises or is the approved user device or the approved game-playing apparatus based on determining, using the one or more computing device processors, the physical location information or the identification information is at least partially consistent with or mappable to second information or second identification information, or determining, using the one or more computing device processors, a period of validity associated with the information or the game information has not expired; receiving, from the remote computing apparatus, the location-related information in encrypted fashion; transmitting the encrypted location-related information to the game-playing apparatus, wherein the game-playing apparatus decrypts the location-related information and transmits, to the user device, a list of allowable games for the physical location of the user device; wherein the game-playing transaction is conducted or is to be conducted on a first communication interface, and wherein the information associated with the game-playing transaction is received or sent on the first communication interface or a second communication interface.

In some embodiments, a method comprises selecting a game on a user device; receiving or sending information, associated with a game-playing transaction, between the user device and a game-playing apparatus, wherein the game-playing transaction is associated with the game, wherein the game is associated with or comprises game information; determining, using one or more computing device processors, physical location information associated with the user device or the game-playing apparatus; transmitting the physical location information to a remote computing apparatus, wherein the remote computing apparatus determines the user device or the game-playing apparatus comprises or is an approved user device or an approved game-playing apparatus and transmits location-related information to the user device, wherein the approved user device or the approved game-playing apparatus is located in an approved physical location associated with the game, and wherein the computing apparatus determines the user device or the game-playing apparatus comprises or is the approved user device or the approved game-playing apparatus based on: determining, using the one or more computing device processors, the user device or the game-playing apparatus comprises or is the approved user device or the approved game-playing apparatus based on determining, using the one or more computing device processors, the physical location information or the identification information is at least partially consistent with or mappable to second information or second identification information, or determining, using the one or more computing device processors, a period of validity associated with the information or the game information has not expired; receiving, from the remote computing apparatus, the location-related information in encrypted fashion; transmitting the encrypted location check information to the game-playing apparatus, wherein the game-playing apparatus decrypts the location-related information and enables initiation or conduction of the game on the user device, wherein the game-playing transaction is conducted or is to be conducted on a first communication interface, and wherein the information associated with the game-playing transaction is received or sent on the first communication interface or a second communication interface.

In some embodiments, an apparatus is provided for processing, or enabling initiation or conduction of, game-playing transactions, the apparatus comprising one or more computing device processors configured to: receive or send information, associated with a game-playing transaction, between a user device and a game-playing apparatus, wherein the game-playing transaction is associated with a game, wherein the game is associated with or comprises game information; determine location information or identification information associated with the user device or the game-playing apparatus; determine the user device or the game-playing apparatus is associated with approved location information or approved identification information associated with the game, wherein the user device or the game-playing apparatus is located in an approved location associated with the game; process the information or the game-playing transaction, or enable initiation or conduction of the game-playing transaction, based on at least one of: determining the user device or the game-playing apparatus is associated with the approved location information or the approved identification information associated with the game based on determining the location information or the identification information is at least partially consistent with or mappable to second information or second identification information, or determining a period of validity associated with the information or the game information has not expired, wherein the game-playing transaction is conducted or is to be conducted on a first communication interface, and wherein the information associated with the game-playing transaction is received or sent on the first communication interface or a second communication interface.

In some embodiments, the game-playing transaction comprises, is, or is comprised in at least one of a gaming transaction, a wagering transaction, a game initiation transaction, a game completing transaction, a pre-game transaction, a post-game transaction, an in-game transaction, a game-related transaction, a betting transaction, a location determining transaction, an identification transaction, an information processing transaction, a user identification transaction, a user device identifying transaction, a mobile device identifying transaction, an apparatus-related transaction, a game-playing apparatus-related transaction, or a game-playing apparatus identifying transaction.

In some embodiments, at least one of: determining the user device or the game-playing apparatus is associated with the approved location information or the approved identification information associated with the game based on determining the location information or the identification information is at least partially consistent with or mappable to the second information or the second identification information, or determining the period of validity associated with the information or the game information has not expired, comprises: determining the user device or the game-playing apparatus is associated with the approved location information or the approved identification information associated with the game based on determining the location information or the identification information is at least partially consistent with or mappable to the second information or the second identification information.

In some embodiments, at least one of: determining the user device or the game-playing apparatus is associated with the approved location information or the approved identification information associated with the game based on determining the location information or the identification information is at least partially consistent with or mappable to the second information or the second identification information, or determining the period of validity associated with the information or the game information has not expired, comprises: determining the period of validity associated with the information or the game information has not expired.

In some embodiments, the apparatus is further configured to modify or configure the user device or the game-playing apparatus based on the determination that the user device or the game-playing apparatus is associated with the approved location information or the approved identification information associated with the game.

In some embodiments, the one or more computing device processors are software-customized for processing the information, or enabling the initiation or the conduction of, the game-playing transaction.

In some embodiments, at least one of the user device or the game-playing apparatus comprises, is, or is associated with, integrated with, or comprised in at least one of a pump, an ATM, a servicing station, a retail apparatus, an entity, one or more mobile computing devices, one or more non-mobile computing devices, one or more local computing apparatuses, one or more remote computing apparatuses, or the apparatus.

In some embodiments, at least one of the first communication interface or the second communication interface is located between the apparatus, or the game-playing apparatus, and the user device, and wherein the at least one of the first communication interface or the second communication interface comprises one or more intermediary computing devices enabling communication between the apparatus, or the game-playing apparatus, and the user device.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method for processing, or enabling initiation or conduction of, game-playing transactions, the method comprising:

enabling generation or initiation of a game comprising an interface for playing the game on a user device; and
integrating gaming compliance operations into the game, wherein the gaming compliance operations comprise:
receiving or sending information, associated with a game-playing transaction, between a user device and a game-playing apparatus, wherein the game-playing transaction is associated with the game, wherein the game is associated with or comprises game information,
determining, using one or more computing device processors, location information or identification information associated with the user device or the game-playing apparatus,
determining, using the one or more computing device processors, the user device or the game-playing apparatus comprises or is an approved user device or an approved game-playing apparatus, wherein the approved user device or the approved game-playing apparatus is located in an approved location associated with the game, and processing the information or the game-playing transaction, or enabling initiation or conduction of the game-playing transaction, based on at least one of:

determining, using the one or more computing device processors, the user device or the game-playing apparatus comprises or is the approved user device or the approved game-playing apparatus based on determining, using the one or more computing device processors, the location information or the identification information is at least partially consistent with or mappable to second information or second identification information, or determining, using the one or more computing device processors, a period of validity associated with the information or the game information has not expired, wherein the game-playing transaction is conducted or is to be conducted on a first communication interface, and wherein the information associated with the game-playing transaction is received or sent on the first communication interface or a second communication interface.

2. The method of claim 1, wherein the game-playing transaction comprises, is, or is comprised in at least one of a gaming transaction, a wagering transaction, a game initiation transaction, a game completing transaction, a lottery transaction, a pre-game transaction, a post-game transaction, an in-game transaction, a game-related transaction, a card-based transaction, a slot game transaction, a betting transaction, a casino game transaction, a location determining transaction, an identification transaction, an information processing transaction, a sports betting transaction, a predictive transaction, a user identification transaction, a user device identifying transaction, a mobile device identifying transaction, a game-playing apparatus-related transaction, or a game-playing apparatus identifying transaction.

3. The method of claim 1, wherein the one or more computing device processors are comprised in at least one of the user device, the game-playing apparatus, or one or more local or remote computing apparatuses.

4. The method of claim 1, wherein the one or more computing device processors are software-customized for performing specialized operations associated with the game-playing transaction.

5. The method of claim 1, wherein the user device or the game-playing apparatus comprises, is, or is associated with, integrated with, or comprised in at least one of a pump, an ATM, a servicing station, a retail apparatus, an entity, one or more mobile computing devices, one or more non-mobile computing devices, one or more local computing apparatuses, or one or more remote computing apparatuses.

6. The method of claim 1, wherein the first communication interface is located between the user device and game-playing apparatus, wherein the second communication interface is located at least one of between the user device and the game-playing apparatus, or between the game-playing apparatus and a second game-playing apparatus, and wherein the first communication interface and the second communication interface are the same communication interface or are different communication interfaces.

7. The method of claim 1, wherein the game-playing apparatus comprises a customized gaming facilitator, wherein the customized gaming facilitator comprises a firewall, logging security, core logic, and customized transaction logic.

8. The method of claim 1, wherein the information comprises the identification information associated with the user device or the game-playing apparatus.

9. The method of claim 1, wherein receiving or sending the information is executed before, after, as part of, or substantially simultaneously with the game-playing transaction.

10. The method of claim 1, wherein the game-playing apparatus comprises one or more game-playing apparatuses, and wherein the one or more computing device processors are comprised in the one or more game-playing apparatuses.

11. The method of claim 1, further comprising determining whether the game is allowable for game play in the approved location.

12. A method for processing, or enabling initiation or conduction of, game-playing transactions, the method comprising:

initiating a gaming application on a user device, the initiation of the gaming application triggering a gaming protection appliance to contact a gaming compliance appliance at a remote server, wherein the remote server performs:

receiving or sending information, associated with a game-playing transaction, between the user device and a game-playing apparatus, wherein the game-playing transaction is associated with a game, wherein the game is associated with or comprises game information, determining, using one or more computing device processors, location information or identification information associated with the user device or the game-playing apparatus, determining, using the one or more computing device processors, the user device or the game-playing apparatus comprises or is an approved user device or an approved game-playing apparatus, wherein the approved user device or the approved game-playing apparatus is located in an approved location associated with the game, and processing the information or the game-playing transaction, or enabling initiation or conduction of the game-playing transaction, based on at least one of:

determining, using the one or more computing device processors, the user device or the game-playing apparatus comprises or is the approved user device or the approved game-playing apparatus based on determining, using the one or more computing device processors, the location information or the identification information is at least partially consistent with or mappable to second information or second identification information, or determining, using the one or more computing device processors, a period of validity associated with the information or the game information has not expired, and transmitting, using the one or more computing device processors, a result of the processing the information to the user device, and processing the result by the gaming application on the user device; and initiating presentation of, by the gaming application on the user device, a list of allowable games in the jurisdiction based on the result, wherein the game-playing transaction is conducted or is to be conducted on a first communication interface, and wherein the information associated with the game-playing transaction is received or sent on the first communication interface or a second communication interface.

13. The method of claim 12, wherein the result of the processing the information transmitted to the user device is encrypted, and wherein the user device decrypts the encrypted result.

14. The method of claim 12, wherein the game-playing transaction comprises, is, or is comprised in at least one of a gaming transaction, a wagering transaction, a game initiation transaction, a game completing transaction, a lottery transaction, a pre-game transaction, a post-game transaction, a slot game transaction, an in-game transaction, a game-related transaction, a card-based transaction, a betting transaction, a casino game transaction, a location determining transaction, an identification transaction, a predictive transaction, an information processing transaction, a sports betting transaction, a user identification transaction, a user device identifying transaction, a mobile device identifying transaction, a game-playing apparatus-related transaction, or a game-playing apparatus identifying transaction.

15. The method of claim 12, wherein the one or more computing device processors are comprised in at least one of the user device, the game-playing apparatus, or one or more local or remote computing apparatuses.

16. An apparatus for processing, or enabling initiation or conduction of, game-playing transactions, the apparatus comprising one or more computing device processors configured to:
enable generation or initiation of a game comprising an interface for playing a game on a user device;
integrate gaming compliance operations into the game, wherein the gaming compliance operations comprise:
receive or send information, associated with a game-playing transaction, between a user device and a game-playing apparatus, wherein the game-playing transaction is associated with a game, wherein the game is associated with or comprises game information,
determine location information or identification information associated with the user device or the game-playing apparatus,
determine the user device or the game-playing apparatus is associated with approved location information or approved identification information associated with the game, wherein the user device or the game-playing apparatus is located in an approved location associated with the game, and
process the information or the game-playing transaction, or enable initiation or conduction of the game-playing transaction, based on at least one of:
determining the user device or the game-playing apparatus is associated with the approved location information or the approved identification information associated with the game based on determining the location information or the identification information is at least partially consistent with or mappable to second information or second identification information, or
determining a period of validity associated with the information or the game information has not expired,
wherein the game-playing transaction is conducted or is to be conducted on a first communication interface, and
wherein the information associated with the game-playing transaction is received or sent on the first communication interface or a second communication interface.

17. The apparatus of claim 16, wherein the game-playing transaction comprises, is, or is comprised in at least one of a gaming transaction, a wagering transaction, a game initiation transaction, a game completing transaction, a pre-game transaction, a post-game transaction, an in-game transaction, a game-related transaction, a betting transaction, a location determining transaction, an identification transaction, an information processing transaction, a casino game transaction, a slot game transaction, a sports betting transaction, a user identification transaction, a user device identifying transaction, a predictive transaction, a mobile device identifying transaction, an apparatus-related transaction, a game-playing apparatus-related transaction, or a game-playing apparatus identifying transaction.

18. The apparatus of claim 16, wherein the apparatus is further configured to modify or configure the user device or the game-playing apparatus based on the determination that the user device or the game-playing apparatus is associated with the approved location information or the approved identification information associated with the game.

19. The apparatus of claim 16, wherein at least one of the user device or the game-playing apparatus comprises, is, or is associated with, integrated with, or comprised in at least one of a pump, an ATM, a servicing station, a retail apparatus, an entity, one or more mobile computing devices, one or more non-mobile computing devices, one or more local computing apparatuses, one or more remote computing apparatuses, or the apparatus.

20. The apparatus of claim 16, wherein at least one of the first communication interface or the second communication interface is located between the apparatus, or the game-playing apparatus, and the user device, and wherein the at least one of the first communication interface or the second communication interface comprises one or more intermediary computing devices enabling communication between the apparatus, or the game-playing apparatus, and the user device.

* * * * *